United States Patent
Kumar et al.

(10) Patent No.: US 10,003,552 B2
(45) Date of Patent: Jun. 19, 2018

(54) DISTRIBUTED BIDIRECTIONAL FORWARDING DETECTION PROTOCOL (D-BFD) FOR CLUSTER OF INTERCONNECTED SWITCHES

(71) Applicant: BROCADE COMMUNICATIONS SYSTEMS, INC., San Jose, CA (US)

(72) Inventors: Pavan Kumar, Bangalore (IN); Prabu Thayalan, Bangalore (IN); Shivalingayya Chikkamath, Bangalore (IN); Mythilikanth Raman, San Jose, CA (US)

(73) Assignee: BROCADE COMMUNICATIONS SYSTEMS, LLC., San Jose, CA (US)

( * ) Notice: Subject to any disclaimer, the term of this patent is extended or adjusted under 35 U.S.C. 154(b) by 306 days.

(21) Appl. No.: 14/830,035

(22) Filed: Aug. 19, 2015

(65) Prior Publication Data

US 2016/0197853 A1    Jul. 7, 2016

Related U.S. Application Data

(60) Provisional application No. 62/099,983, filed on Jan. 5, 2015.

(51) Int. Cl.
*H04L 12/933* (2013.01)
*H04L 12/26* (2006.01)
(Continued)

(52) U.S. Cl.
CPC ............. *H04L 49/15* (2013.01); *H04L 43/10* (2013.01); *H04L 45/02* (2013.01); *H04L 45/026* (2013.01);
(Continued)

(58) Field of Classification Search
CPC ... H04L 41/0654; H04L 41/147; H04L 45/02; H04L 45/00; H04L 45/586; H04L 45/026;
(Continued)

(56) References Cited

U.S. PATENT DOCUMENTS

| 829,529 A | 8/1986 | Keathley |
| 5,390,173 A | 2/1995 | Spinney |

(Continued)

FOREIGN PATENT DOCUMENTS

| EP | 0579567 | 5/1993 |
| EP | 0579567 A2 | 1/1994 |

(Continued)

OTHER PUBLICATIONS

Eastlake, D. et al., 'RBridges: TRILL Header Options', Dec. 24, 2009, pp. 1-17, TRILL Working Group.

(Continued)

*Primary Examiner* — Kwang B Yao
*Assistant Examiner* — Ricardo Castaneyra
(74) *Attorney, Agent, or Firm* — Shun Yao; Park, Vaughan, Fleming & Dowler LLP

(57) ABSTRACT

One embodiment of the present invention provides a switch which comprises one or more ports adapted to receive packets. The switch is a member of a network of interconnected switches, and also comprises a path monitoring apparatus adapted to: in response to a control packet associated with a session within a predetermined time interval, set a receive indicator for the switch to an active state; and in response to absence of the control packet associated with the session within the predetermined time interval, set the receive indicator for the switch to an inactive state. The path monitoring apparatus is also adapted to set a path state associated with the session based on the receive indicators for the switch and other member switches. The switch also (Continued)

comprises a broadcast apparatus adapted to broadcast at least the receive indicator for the switch to the other member switches.

25 Claims, 14 Drawing Sheets

(51) Int. Cl.
*H04L 12/751* (2013.01)
*H04L 12/713* (2013.01)
*H04L 12/803* (2013.01)
*H04L 12/931* (2013.01)

(52) U.S. Cl.
CPC .......... *H04L 45/586* (2013.01); *H04L 47/125* (2013.01); *H04L 49/201* (2013.01)

(58) Field of Classification Search
CPC ..... H04L 49/15; H04L 49/201; H04L 47/125; H04L 43/10; H04L 45/22; H04L 45/28; H04L 49/25; H04L 12/4633
See application file for complete search history.

(56) References Cited

U.S. PATENT DOCUMENTS

| | | | |
|---|---|---|---|
| 5,802,278 | A | 9/1998 | Isfeld |
| 5,878,232 | A | 3/1999 | Marimuthu |
| 5,879,173 | A | 3/1999 | Poplawski |
| 5,959,968 | A | 9/1999 | Chin |
| 5,973,278 | A | 10/1999 | Wehrill, III |
| 5,983,278 | A | 11/1999 | Chong |
| 5,995,262 | A | 11/1999 | Hirota |
| 6,041,042 | A | 3/2000 | Bussiere |
| 6,085,238 | A | 7/2000 | Yuasa |
| 6,092,062 | A | 7/2000 | Lohman |
| 6,104,696 | A | 8/2000 | Kadambi |
| 6,185,214 | B1 | 2/2001 | Schwartz |
| 6,185,241 | B1 | 2/2001 | Sun |
| 6,295,527 | B1 | 9/2001 | McCormack |
| 6,331,983 | B1 | 12/2001 | Haggerty |
| 6,438,106 | B1 | 8/2002 | Pillar |
| 6,498,781 | B1 | 12/2002 | Bass |
| 6,542,266 | B1 | 4/2003 | Phillips |
| 6,553,029 | B1 | 4/2003 | Alexander |
| 6,571,355 | B1 | 5/2003 | Linnell |
| 6,583,902 | B1 | 6/2003 | Yuen |
| 6,633,761 | B1 | 10/2003 | Singhal |
| 6,636,963 | B1 | 10/2003 | Stein |
| 6,771,610 | B1 | 8/2004 | Seaman |
| 6,870,840 | B1 | 3/2005 | Hill |
| 6,873,602 | B1 | 3/2005 | Ambe |
| 6,920,503 | B1 | 7/2005 | Nanji |
| 6,937,576 | B1 | 8/2005 | DiBenedetto |
| 6,956,824 | B2 | 10/2005 | Mark |
| 6,957,269 | B2 | 10/2005 | Williams |
| 6,975,581 | B1 | 12/2005 | Medina |
| 6,975,864 | B2 | 12/2005 | Singhal |
| 7,016,352 | B1 | 3/2006 | Chow |
| 7,061,877 | B1 | 6/2006 | Gummalla |
| 7,062,177 | B1 | 6/2006 | Grivna |
| 7,097,308 | B2 | 8/2006 | Kim et al. |
| 7,173,934 | B2 | 2/2007 | Lapuh |
| 7,197,308 | B2 | 3/2007 | Singhal |
| 7,206,288 | B2 | 4/2007 | Cometto |
| 7,310,664 | B1 | 12/2007 | Merchant |
| 7,313,637 | B2 | 12/2007 | Tanaka |
| 7,315,545 | B1 | 1/2008 | Chowdhury et al. |
| 7,316,031 | B2 | 1/2008 | Griffith |
| 7,330,897 | B2 | 2/2008 | Baldwin |
| 7,380,025 | B1 | 5/2008 | Riggins |
| 7,397,768 | B1 | 7/2008 | Betker |
| 7,397,794 | B1 | 7/2008 | Lacroute |
| 7,430,164 | B2 | 9/2008 | Bare |
| 7,453,888 | B2 | 11/2008 | Zabihi |
| 7,477,894 | B1 | 1/2009 | Sinha |
| 7,480,258 | B1 | 1/2009 | Shuen |
| 7,508,757 | B2 | 3/2009 | Ge |
| 7,558,195 | B1 | 7/2009 | Kuo |
| 7,558,273 | B1 | 7/2009 | Grosser |
| 7,571,447 | B2 | 8/2009 | Ally |
| 7,599,901 | B2 | 10/2009 | Mital |
| 7,653,056 | B1 | 1/2010 | Dianes |
| 7,688,736 | B1 | 3/2010 | Walsh |
| 7,688,960 | B1 | 3/2010 | Aubuchon |
| 7,690,040 | B2 | 3/2010 | Frattura |
| 7,706,255 | B1 | 4/2010 | Kondrat et al. |
| 7,716,370 | B1 | 5/2010 | Devarapalli |
| 7,720,076 | B2 | 5/2010 | Dobbins |
| 7,729,296 | B1 | 6/2010 | Choudhary |
| 7,787,480 | B1 | 8/2010 | Mehta |
| 7,792,920 | B2 | 9/2010 | Istvan |
| 7,796,593 | B1 | 9/2010 | Ghosh |
| 7,801,021 | B1 | 9/2010 | Triantafillis |
| 7,808,992 | B2 | 10/2010 | Homchaudhuri |
| 7,836,332 | B2 | 11/2010 | Hara |
| 7,843,906 | B1 | 11/2010 | Chidambaram et al. |
| 7,843,907 | B1 | 11/2010 | Abou-Emara |
| 7,860,097 | B1 | 12/2010 | Lovett |
| 7,898,959 | B1 | 3/2011 | Arad |
| 7,912,091 | B1 | 3/2011 | Krishnan |
| 7,924,837 | B1 | 4/2011 | Shabtay |
| 7,937,438 | B1 | 5/2011 | Miller |
| 7,937,756 | B2 | 5/2011 | Kay |
| 7,945,941 | B2 | 5/2011 | Sinha |
| 7,949,638 | B1 | 5/2011 | Goodson |
| 7,957,386 | B1 | 6/2011 | Aggarwal |
| 8,018,938 | B1 | 9/2011 | Fromm |
| 8,027,354 | B1 | 9/2011 | Portolani |
| 8,054,832 | B1 | 11/2011 | Shukla |
| 8,068,442 | B1 | 11/2011 | Kompella |
| 8,078,704 | B2 | 12/2011 | Lee |
| 8,090,805 | B1 | 1/2012 | Chawla |
| 8,102,781 | B2 | 1/2012 | Smith |
| 8,102,791 | B2 | 1/2012 | Tang |
| 8,116,307 | B1 | 2/2012 | Thesayi |
| 8,125,928 | B2 | 2/2012 | Mehta |
| 8,134,922 | B2 | 3/2012 | Elangovan |
| 8,155,150 | B1 | 4/2012 | Chung |
| 8,160,063 | B2 | 4/2012 | Maltz |
| 8,160,080 | B1 | 4/2012 | Arad |
| 8,170,038 | B2 | 5/2012 | Belanger |
| 8,175,107 | B1 | 5/2012 | Yalagandula |
| 8,095,774 | B1 | 6/2012 | Lambeth |
| 8,194,674 | B1 | 6/2012 | Pagel |
| 8,195,774 | B2 | 6/2012 | Lambeth |
| 8,204,061 | B1 | 6/2012 | Sane |
| 8,213,313 | B1 | 7/2012 | Doiron |
| 8,213,336 | B2 | 7/2012 | Smith |
| 8,230,069 | B2 | 7/2012 | Korupolu |
| 8,239,960 | B2 | 8/2012 | Frattura |
| 8,249,069 | B2 | 8/2012 | Raman |
| 8,270,401 | B1 | 9/2012 | Barnes |
| 8,295,291 | B1 | 10/2012 | Ramanathan |
| 8,295,921 | B2 | 10/2012 | Wang |
| 8,301,686 | B1 | 10/2012 | Appajodu |
| 8,339,994 | B2 | 12/2012 | Gnanasekaran |
| 8,351,352 | B1 | 1/2013 | Eastlake |
| 8,369,335 | B2 | 2/2013 | J Ha |
| 8,369,347 | B2 | 2/2013 | Xiong |
| 8,392,496 | B2 | 3/2013 | Linden |
| 8,451,717 | B2 | 5/2013 | Srikrishnan |
| 8,462,774 | B2 | 6/2013 | Page |
| 8,465,774 | B2 | 6/2013 | Page |
| 8,467,375 | B2 | 6/2013 | Blair |
| 8,520,595 | B2 | 8/2013 | Yadav |
| 8,553,710 | B1 | 10/2013 | White |
| 8,595,479 | B2 | 11/2013 | Radhakrishnan |
| 8,599,850 | B2 | 12/2013 | J Ha |
| 8,599,864 | B2 | 12/2013 | Chung |
| 8,615,008 | B2 | 12/2013 | Natarajan |
| 8,619,788 | B1 | 12/2013 | Sankaran |
| 8,625,616 | B2 | 1/2014 | Vobbilisetty |

(56) References Cited

U.S. PATENT DOCUMENTS

| | | |
|---|---|---|
| 8,705,526 B1 | 4/2014 | Hasan |
| 8,706,905 B1 | 4/2014 | McGlaughlin |
| 8,717,895 B2 | 5/2014 | Koponen |
| 8,724,456 B1 | 5/2014 | Hong |
| 8,792,501 B1 | 7/2014 | Rustagi |
| 8,798,045 B1 | 8/2014 | Aybay |
| 8,798,055 B1 | 8/2014 | An |
| 8,804,732 B1 | 8/2014 | Hepting |
| 8,804,736 B1 | 8/2014 | Drake |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,948,181 B2 | 2/2015 | Kapadia |
| 8,971,173 B1 | 3/2015 | Choudhury |
| 8,995,272 B2 | 3/2015 | Agarwal |
| 9,019,976 B2 | 4/2015 | Gupta |
| 9,178,793 B1 | 11/2015 | Marlow |
| 9,231,890 B2 | 1/2016 | Vobbilisetty |
| 9,350,680 B2 | 5/2016 | Thayalan |
| 9,401,818 B2 | 7/2016 | Venkatesh |
| 9,438,447 B2 | 9/2016 | Basso |
| 9,524,173 B2 | 12/2016 | Guntaka |
| 9,626,255 B2 | 4/2017 | Guntaka |
| 9,628,407 B2 | 4/2017 | Guntaka |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0027885 A1 | 3/2002 | Ben-Ami |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2003/0026290 A1 | 2/2003 | Umayabashi |
| 2003/0041085 A1 | 2/2003 | Sato |
| 2003/0093567 A1 | 5/2003 | Lolayekar |
| 2003/0097464 A1 | 5/2003 | Martinez |
| 2003/0097470 A1 | 5/2003 | Lapuh |
| 2003/0123393 A1 | 7/2003 | Feuerstraeter |
| 2003/0147385 A1 | 8/2003 | Montalvo |
| 2003/0152075 A1 | 8/2003 | Hawthorne |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 | 1/2004 | Gram |
| 2004/0003094 A1 | 1/2004 | See |
| 2004/0010600 A1 | 1/2004 | Baldwin |
| 2004/0088668 A1 | 1/2004 | Bornowski |
| 2004/0047349 A1 | 3/2004 | Fujita |
| 2004/0049699 A1 | 3/2004 | Griffith |
| 2004/0057430 A1 | 3/2004 | Paavolainen |
| 2004/0081171 A1 | 4/2004 | Finn |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0025179 A1 | 2/2005 | McLaggan |
| 2005/0036488 A1 | 2/2005 | Kalkunte |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0111352 A1 | 5/2005 | Ho |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265330 A1 | 12/2005 | Suzuki |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0039366 A1 | 2/2006 | Ghosh |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0092860 A1 | 5/2006 | Higashitaniguchi |
| 2006/0093254 A1 | 5/2006 | Mozdy |
| 2006/0098589 A1 | 5/2006 | Kreeger |
| 2006/0126511 A1 | 6/2006 | Youn |
| 2006/0140130 A1 | 6/2006 | Kalkunte |
| 2006/0155828 A1 | 7/2006 | Ikeda |
| 2006/0168109 A1 | 7/2006 | Warmenhoven |
| 2006/0184937 A1 | 8/2006 | Abels |
| 2006/0206655 A1 | 9/2006 | Chappell |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0121617 A1 | 5/2007 | Kanekar |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0230472 A1 | 10/2007 | Jesuraj |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2008/0052487 A1 | 2/2008 | Akahane |

(56) References Cited

U.S. PATENT DOCUMENTS

| | | |
|---|---|---|
| 2008/0056135 A1 | 3/2008 | Lee |
| 2008/0056300 A1 | 3/2008 | Williams |
| 2008/0057918 A1 | 3/2008 | Abrant |
| 2008/0065760 A1 | 3/2008 | Damm |
| 2008/0075078 A1 | 3/2008 | Watanabe |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens |
| 2008/0159260 A1 | 7/2008 | Vobbilisetty |
| 2008/0159277 A1 | 7/2008 | Vobbilisetty |
| 2008/0165705 A1 | 7/2008 | Umayabashi |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186968 A1 | 8/2008 | Farinacci |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0253380 A1 | 10/2008 | Cazares |
| 2008/0267179 A1 | 10/2008 | Lavigne |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0304519 A1 | 12/2008 | Koenen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0037977 A1 | 2/2009 | Gai |
| 2009/0041046 A1 | 2/2009 | Hirata |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0129389 A1 | 5/2009 | Halna DeFretay |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0225752 A1 | 9/2009 | Mitsumori |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0246137 A1 | 10/2009 | Hadida |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0279701 A1 | 11/2009 | Moisand |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1* | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0027429 A1 | 2/2010 | Jorgens |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0192225 A1 | 7/2010 | Ma |
| 2010/0195489 A1 | 8/2010 | Zhou |
| 2010/0195529 A1 | 8/2010 | Liu |
| 2010/0214913 A1 | 8/2010 | Kompella |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0246580 A1 | 9/2010 | Kaganoi |
| 2010/0254703 A1 | 10/2010 | Kirkpatrick |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290472 A1 | 11/2010 | Raman |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0316055 A1 | 12/2010 | Belanger |
| 2010/0329110 A1 | 12/2010 | Rose |
| 2010/0329265 A1 | 12/2010 | Lapuh |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0058547 A1 | 3/2011 | Waldrop |
| 2011/0064086 A1 | 3/2011 | Xiong |
| 2011/0064089 A1 | 3/2011 | Hidaka |

(56) References Cited

U.S. PATENT DOCUMENTS

| | | |
|---|---|---|
| 2011/0072208 A1 | 3/2011 | Gulati |
| 2011/0085560 A1 | 4/2011 | Chawla |
| 2011/0085562 A1 | 4/2011 | Bao |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134924 A1 | 6/2011 | Hewson |
| 2011/0134925 A1 | 6/2011 | Safrai |
| 2011/0142053 A1 | 6/2011 | VanDerMerwe |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0225540 A1 | 9/2011 | d'Entremont |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0055274 A1 | 12/2011 | Hegge |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033668 A1 | 2/2012 | Humphries |
| 2012/0033669 A1 | 2/2012 | Mohandas |
| 2012/0033672 A1 | 2/2012 | Page |
| 2012/0039163 A1 | 2/2012 | Nakajima |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243359 A1 | 9/2012 | Keesara |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0281700 A1 | 11/2012 | Koganti |
| 2012/0287785 A1 | 11/2012 | Kamble |
| 2012/0294192 A1 | 11/2012 | Masood |
| 2012/0294194 A1 | 11/2012 | Balasubramanian |
| 2012/0230800 A1 | 12/2012 | Kamble |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003608 A1 | 1/2013 | Lei |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0034094 A1 | 2/2013 | Cardona |
| 2013/0044629 A1 | 2/2013 | Biswas |
| 2013/0058354 A1 | 3/2013 | Casado |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0124707 A1 | 5/2013 | Ananthapadmanabha |
| 2013/0124750 A1 | 5/2013 | Anumala |
| 2013/0127848 A1 | 5/2013 | Joshi |
| 2013/0132296 A1 | 5/2013 | Manfred |
| 2013/0135811 A1 | 5/2013 | Dunwoody |
| 2013/0136123 A1 | 5/2013 | Ge |
| 2013/0145008 A1 | 6/2013 | Kannan |
| 2013/0148546 A1 | 6/2013 | Eisenhauer |
| 2013/0148663 A1 | 6/2013 | Xiong |
| 2013/0156425 A1 | 6/2013 | Kirkpatrick |
| 2013/0194914 A1 | 8/2013 | Agarwal |
| 2013/0201992 A1 | 8/2013 | Masaki |
| 2013/0219473 A1 | 8/2013 | Schaefer |
| 2013/0223221 A1 | 8/2013 | Xu |
| 2013/0223449 A1 | 8/2013 | Koganti |
| 2013/0250951 A1 | 9/2013 | Koganti |
| 2013/0250958 A1 | 9/2013 | Watanabe |
| 2013/0259037 A1 | 10/2013 | Natarajan |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Udutha et al. |
| 2013/0301642 A1 | 11/2013 | Radhakrishnan |
| 2013/0308492 A1 | 11/2013 | Baphna |
| 2013/0308647 A1 | 11/2013 | Rosset |
| 2013/0315125 A1 | 11/2013 | Ravishankar |
| 2013/0315586 A1 | 11/2013 | Kipp |
| 2013/0322427 A1 | 12/2013 | Stiekes |

(56) References Cited

U.S. PATENT DOCUMENTS

| | | |
|---|---|---|
| 2013/0332660 A1 | 12/2013 | Talagala |
| 2013/0336104 A1 | 12/2013 | Talla |
| 2013/0346583 A1 | 12/2013 | Low |
| 2014/0013324 A1 | 1/2014 | Zhang |
| 2014/0019608 A1 | 1/2014 | Kawakami |
| 2014/0025736 A1 | 1/2014 | Wang |
| 2014/0029419 A1* | 1/2014 | Jain .................. H04L 41/0668 370/228 |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0071987 A1 | 3/2014 | Janardhanan |
| 2014/0086253 A1 | 3/2014 | Yong |
| 2014/0092738 A1 | 4/2014 | Grandhi |
| 2014/0105034 A1 | 4/2014 | Huawei |
| 2014/0112122 A1 | 4/2014 | Kapadia |
| 2014/0140243 A1 | 5/2014 | Ashwood-Smith |
| 2014/0157251 A1 | 6/2014 | Hocker |
| 2014/0169368 A1 | 6/2014 | Grover |
| 2014/0192804 A1 | 7/2014 | Ghanwani |
| 2014/0241147 A1 | 8/2014 | Rajagopalan |
| 2014/0258446 A1 | 9/2014 | Bursell |
| 2014/0269701 A1 | 9/2014 | Kaushik |
| 2014/0269720 A1 | 9/2014 | Srinivasan |
| 2014/0269733 A1 | 9/2014 | Venkatesh |
| 2014/0298091 A1 | 10/2014 | Carlen |
| 2014/0355477 A1 | 12/2014 | Velayudhan et al. |
| 2014/0362854 A1 | 12/2014 | Addanki |
| 2014/0362859 A1 | 12/2014 | Addanki |
| 2015/0009992 A1 | 1/2015 | Zhang |
| 2015/0010007 A1 | 1/2015 | Matsuhira |
| 2015/0016300 A1 | 1/2015 | Devireddy |
| 2015/0030031 A1 | 1/2015 | Zhou |
| 2015/0092593 A1 | 4/2015 | Kompella |
| 2015/0110111 A1 | 4/2015 | Song |
| 2015/0110487 A1 | 4/2015 | Fenkes |
| 2015/0117256 A1 | 4/2015 | Sabaa |
| 2015/0127618 A1 | 5/2015 | Alberti |
| 2015/0139234 A1 | 5/2015 | Hu |
| 2015/0143369 A1 | 5/2015 | Zheng |
| 2015/0172098 A1 | 6/2015 | Agarwal |
| 2015/0188753 A1 | 7/2015 | Anumala |
| 2015/0195093 A1 | 7/2015 | Ramasubramani |
| 2015/0222506 A1 | 8/2015 | Kizhakkiniyil |
| 2015/0248298 A1 | 9/2015 | Gavrilov |
| 2015/0263991 A1 | 9/2015 | MacChiano |
| 2015/0281066 A1 | 10/2015 | Koley |
| 2015/0301901 A1 | 10/2015 | Rath |
| 2015/0347468 A1 | 12/2015 | Bester |
| 2016/0072899 A1 | 3/2016 | Tung |
| 2016/0087885 A1 | 3/2016 | Tripathi |
| 2016/0139939 A1 | 5/2016 | Bosch |
| 2016/0182458 A1 | 6/2016 | Shatzkamer |
| 2016/0344640 A1 | 11/2016 | Soderlund et al. |
| 2017/0026197 A1 | 1/2017 | Venkatesh |
| 2017/0097841 A1 | 4/2017 | Chang |

FOREIGN PATENT DOCUMENTS

| | | |
|---|---|---|
| EP | 0993156 | 4/2000 |
| EP | 0993156 A2 | 12/2000 |
| EP | 1398920 | 3/2004 |
| EP | 1398920 A2 | 3/2004 |
| EP | 1916807 A2 | 4/2008 |
| EP | 2001167 A1 | 10/2008 |
| EP | 2854352 | 4/2015 |
| EP | 2874359 | 5/2015 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | 2012033663 | 3/2012 |
| WO | 2012093429 | 7/2012 |
| WO | 2014031781 | 2/2014 |

OTHER PUBLICATIONS

Perlman, Radia et al., 'RBridge VLAN Mapping', TRILL Working Group, Dec. 4, 2009, pp. 1-12.

Touch, J. et al., 'Transparent Interconnection of Lots of Links (TRILL): Problem and Applicability Statement', May 2009, Network Working Group, pp. 1-17.

Switched Virtual Networks. 'Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.

Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].

Office Action dated Jun. 18, 2015, U.S. Appl. No. 13/098,490, filed May 2, 2011.

Perlman R: 'Challenges and opportunities in the design of TRILL: a routed layer 2 technology', 2009 IEEE Globecom Workshops, Honolulu, HI, USA, Piscataway, NJ, USA, Nov. 30, 2009 (Nov. 30, 2009), pp. 1-6, XP002649647, DOI: 10.1109/GLOBECOM.2009. 5360776 ISBN: 1-4244-5626-0 [retrieved on Jul. 19, 2011].

TRILL Working Group Internet-Draft Intended status: Proposed Standard RBridges: Base Protocol Specificaiton Mar. 3, 2010.

Office Action dated Jun. 16, 2015, U.S. Appl. No. 13/048,817, filed Mar. 15, 2011.

Knight P et al: 'Layer 2 and 3 Virtual Private Networks: Taxonomy, Technology, and Standardization efforts', IEEE Communications Magazine, IEEE Service Center, Piscataway, US, vol. 42, No. 6, Jun. 1, 2004 (Jun. 1, 2004), pp. 124-131, XP001198207, ISSN: 0163-6804, DOI: 10.1109/MCOM.2004.1304248.

Office Action for U.S. Appl. No. 13/092,873, filed Apr. 22, 2011, dated Nov. 29, 2013.

Perlman, Radia et al., 'RBridges: Base Protocol Specification; Draft-ietf-trill-rbridge-protocol-16.txt', Mar. 3, 2010, pp. 1-117.

'An Introduction to Brocade VCS Fabric Technology', BROCADE white paper, http://community.brocade.com/docs/DOC-2954, Dec. 3, 2012.

Brocade, 'Brocade Fabrics OS (FOS) 6.2 Virtual Fabrics Feature Frequently Asked Questions', pp. 1-6, 2009 Brocade Communications Systems, Inc.

BROCADE, 'FastIron and TurboIron 24x Configuration Guide', Feb. 16, 2010.

BROCADE, 'The Effortless Network: Hyperedge Technology for the Campus LAN' 2012.

BROCADE 'Brocade Unveils 'The Effortless Network'', http://newsroom.brocade.com/press-releases/brocade-unveils-the-effortless-network-nasdaq-brcd-0859535, 2012.

Christensen, M. et al., 'Considerations for Internet Group Management Protocol (IGMP) and Multicast Listener Discovery (MLD) Snooping Switches', May 2006.

FastIron Configuration Guide Supporting Ironware Software Release 07.0.00, Dec. 18, 2009.

Foundary FastIron Configuration Guide, Software Release FSX 04.2.00b, Software Release FWS 04.3.00, Software Release FGS 05.0.00a, Sep. 2008.

Knight, 'Network Based IP VPN Architecture using Virtual Routers', May 2003.

Kreeger, L. et al., 'Network Virtualization Overlay Control Protocol Requirements draft-kreeger-nvo3-overlay-cp-00', Jan. 30, 2012.

Lapuh, Roger et al., 'Split Multi-link Trunking (SMLT)', draft-lapuh-network-smlt-08, Jul. 2008.

Lapuh, Roger et al., 'Split Multi-Link Trunking (SMLT)', Network Working Group, Oct. 2012.

(56) References Cited

OTHER PUBLICATIONS

Louati, Wajdi et al., 'Network-based virtual personal overlay networks using programmable virtual routers', IEEE Communications Magazine, Jul. 2005.

Narten, T. et al., 'Problem Statement: Overlays for Network Virtualization d raft-narten-n vo3-over I ay-problem -statement-01', Oct. 31, 2011.

Office Action for U.S. Appl. No. 13/092,752, filed Apr. 22, 2011, from Park, Jung H., dated Jul. 18, 2013.

Office Action for U.S. Appl. No. 13/351,513, filed Jan. 17, 2012, dated Jul. 24, 2014.

Office Action for U.S. Appl. No. 13/365,993, filed Feb. 3, 2012, from Cho, Hong Sol., dated Jul. 23, 2013.

Office Action for U.S. Appl. No. 13/742,207 dated Jul. 24, 2014, filed Jan. 15, 2013.

Office Action for U.S. Appl. No. 12/725,249, filed Mar. 16, 2010, dated Apr. 26, 2013.

Office Action for U.S. Appl. No. 12/950,968, filed Nov. 19, 2010, dated Jan. 4, 2013.

Office Action for U.S. Appl. No. 12/950,968, filed Nov. 19, 2010, dated Jun. 7, 2012.

Office Action for U.S. Appl. No. 12/950,974, filed Nov. 19, 2010, dated Dec. 20, 2012.

Office Action for U.S. Appl. No. 12/950,974, filed Nov. 19, 2010, dated May 24, 2012.

Office Action for U.S. Appl. No. 13/030,688, filed Feb. 18, 2011, dated Apr. 25, 2013.

Office Action for U.S. Appl. No. 13/030,806, filed Feb. 18, 2011, dated Dec. 3, 2012.

Office Action for U.S. Appl. No. 13/030,806, filed Feb. 18, 2011, dated Jun. 11, 2013.

Office Action for U.S. Appl. No. 13/042,259, filed Mar. 7, 2011, dated Mar. 18, 2013.

Office Action for U.S. Appl. No. 13/042,259, filed Mar. 7, 2011, dated Jul. 31, 2013.

Office Action for U.S. Appl. No. 13/044,301, filed Mar. 9, 2011, dated Feb. 22, 2013.

Office Action for U.S. Appl. No. 13/044,301, filed Mar. 9, 2011, dated Jun. 11, 2013.

Office Action for U.S. Appl. No. 13/044,326, filed Mar. 9, 2011, dated Oct. 2, 2013.

Office Action for U.S. Appl. No. 13/050,102, filed Mar. 17, 2011, dated Oct. 26, 2012.

Office Action for U.S. Appl. No. 13/050,102, filed Mar. 17, 2011, dated May 16, 2013.

Office Action for U.S. Appl. No. 13/087,239, filed Apr. 14, 2011, dated May 22, 2013.

Office Action for U.S. Appl. No. 13/092,460, filed Apr. 22, 2011, dated Jun. 21, 2013.

Office Action for U.S. Appl. No. 13/092,580, filed Apr. 22, 2011, dated Jun. 10, 2013.

Office Action for U.S. Appl. No. 13/092,701, filed Apr. 22, 2011, dated Jan. 28, 2013.

Office Action for U.S. Appl. No. 13/092,701, filed Apr. 22, 2011, dated Jul. 3, 2013.

Office Action for U.S. Appl. No. 13/092,724, filed Apr. 22, 2011, dated Feb. 5, 2013.

Office Action for U.S. Appl. No. 13/092,724, filed Apr. 22, 2011, dated Jul. 16, 2013.

Office Action for U.S. Appl. No. 13/092,752, filed Apr. 22, 2011, dated Feb. 5, 2013.

Office Action for U.S. Appl. No. 13/092,864, filed Apr. 22, 2011, dated Sep. 19, 2012.

Office Action for U.S. Appl. No. 13/092,873, filed Apr. 22, 2011, dated Jun. 19, 2013.

Office Action for U.S. Appl. No. 13/092,877, filed Apr. 22, 2011, dated Mar. 4, 2013.

Office Action for U.S. Appl. No. 13/092,877, filed Apr. 22, 2011, dated Sep. 5, 2013.

Office Action for U.S. Appl. No. 13/098,360, filed Apr. 29, 2011, dated May 31, 2013.

Office Action for U.S. Appl. No. 13/098,490, filed May 2, 2011, dated Jul. 9, 2013.

Office Action for U.S. Appl. No. 13/184,526, filed Jul. 16, 2011, dated Jan. 28, 2013.

Office Action for U.S. Appl. No. 13/184,526, filed Jul. 16, 2011, dated May 22, 2013.

Office Action for U.S. Appl. No. 13/365,808, filed Jul. 18, 2013, dated Jul. 18, 2013.

Perlman, Radia et al., 'Challenges and Opportunities in the Design of TRILL: a Routed layer 2 Technology', 2009.

S. Nadas et al., 'Virtual Router Redundancy Protocol (VRRP) Version 3 for IPv4 and IPv6', Internet Engineering Task Force, Mar. 2010.

'RBridges: Base Protocol Specification', IETF Draft, Perlman et al., Jun. 26, 2009.

U.S. Appl. No. 13/030,806 Office Action dated Dec. 3, 2012.

Office action dated Apr. 26, 2012, U.S. Appl. No. 12/725,249, filed Mar. 16, 2010.

Office action dated Sep. 12, 2012, U.S. Appl. No. 12/725,249, filed Mar. 16, 2010.

Office action dated Dec. 21, 2012, U.S. Appl. No. 13/098,490, filed May 2, 2011.

Office action dated Mar. 27, 2014, U.S. Appl. No. 13/098,490, filed May 2, 2011.

Office action dated Jul. 9, 2013, U.S. Appl. No. 13/098,490, filed May 2, 2011.

Office action dated May 22, 2013, U.S. Appl. No. 13/087,239, filed Apr. 14, 2011.

Office action dated Dec. 5, 2012, U.S. Appl. No. 13/087,239, filed Apr. 14, 2011.

Office action dated Apr. 9, 2014, U.S. Appl. No. 13/092,724, filed Apr. 22, 2011.

Office action dated Feb. 5, 2013, U.S. Appl. No. 13/092,724, filed Apr. 22, 2011.

Office action dated Jan. 10, 2014, U.S. Appl. No. 13/092,580, filed Apr. 22, 2011.

Office action dated Jun. 10, 2013, U.S. Appl. No. 13/092,580, filed Apr. 22, 2011.

Office action dated Jan. 16, 2014, U.S. Appl. No. 13/042,259, filed Mar. 7, 2011.

Office action dated Mar. 18, 2013, U.S. Appl. No. 13/042,259, filed Mar. 7, 2011.

Office action dated Jul. 31, 2013, U.S. Appl. No. 13/042,259, filed Mar. 7, 2011.

Office action dated Aug. 29, 2014, U.S. Appl. No. 13/042,259, filed Mar. 7, 2011.

Office action dated Mar. 14, 2014, U.S. Appl. No. 13/092,460, filed Apr. 22, 2011.

Office action dated Jun. 21, 2013, U.S. Appl. No. 13/092,460, filed Apr. 22, 2011.

Office action dated Aug. 14, 2014, U.S. Appl. No. 13/092,460, filed Apr. 22, 2011.

Office action dated Jan. 28, 2013, U.S. Appl. No. 13/092,701, filed Apr. 22, 2011.

Office Action dated Mar. 26, 2014, U.S. Appl. No. 13/092,701, filed Apr. 22, 2011.

Office action dated Jul. 3, 2013, U.S. Appl. No. 13/092,701, filed Apr. 22, 2011.

Office Action dated Apr. 9, 2014, U.S. Appl. No. 13/092,752, filed Apr. 22, 2011.

Office action dated Jul. 18, 2013, U.S. Appl. No. 13/092,752, filed Apr. 22, 2011.

Office action dated Dec. 20, 2012, U.S. Appl. No. 12/950,974, filed Nov. 19, 2010.

Office action dated May 24, 2012, U.S. Appl. No. 12/950,974, filed Nov. 19, 2010.

Office action dated Jan. 6, 2014, U.S. Appl. No. 13/092,877, filed Apr. 22, 2011.

Office action dated Sep. 5, 2013, U.S. Appl. No. 13/092,877, filed Apr. 22, 2011.

(56) References Cited

OTHER PUBLICATIONS

Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Jul. 7, 2014, for U.S. Appl. No. 13/044,326, filed Mar. 9, 2011.
Office action dated Oct. 2, 2013, U.S. Appl. No. 13/044,326, filed Mar. 9, 2011.
Office Action dated Dec. 19, 2014, for U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Brocade 'An Introduction to Brocade VCS Fabric Technology', Dec. 3, 2012.

Huang, Nen-Fu et al., 'An Effective Spanning Tree Algorithm for a Bridged LAN', Mar. 16, 1992.
Lapuh, Roger et al., 'Split Multi-link Trunking (SMLT) draft-lapuh-network-smlt-08', Jan. 2009.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/030,688, filed Feb. 18, 2011, dated Jul. 17, 2014.
Office Action for U.S. Appl. No. 13/042,259, filed Mar. 7, 2011, from Jaroenchonwanit, Bunjob, dated Jan. 16, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/950,974, filed Nov. 19, 2010, from Haile, Awet A., dated Dec. 2, 2012.
Office Action for U.S. Appl. No. 12/725,249, filed Mar. 16, 2010, dated Sep. 12, 2012.
Office Action for U.S. Appl. No. 13/098,490, filed May 2, 2011, dated Dec. 21, 2012.
Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/044,301, dated Mar. 9, 2011.
Office Action for U.S. Appl. No. 13/087,239, filed Apr. 14, 2011, dated Dec. 5, 2012.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Office Action for U.S. Appl. No. 13/184,526, filed Jul. 16, 2011, dated Jan. 5, 2015.
Office Action for U.S. Appl. No. 13/184,526, filed Jul. 16, 2011, dated Dec. 2, 2013.
Office Action for U.S. Appl. No. 13/351,513, filed Jan. 17, 2012, dated Feb. 28, 2014.
Office Action for U.S. Appl. No. 13/533,843, filed Jun. 26, 2012, dated Oct. 21, 2013.
Office Action for U.S. Appl. No. 13/598,204, filed Aug. 29, 2012, dated Jan. 5, 2015.
Office Action for U.S. Appl. No. 13/598,204, filed Aug. 29, 2012, dated Feb. 20, 2014.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/092,887, dated Jan. 6, 2014.
Zhai F. Hu et al. 'RBridge: Pseudo-Nickname; draft-hu-trill-pseudonode-nickname-02.txt', May 15, 2012.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Office Action for U.S. Appl. No. 13/042,259, filed Mar. 7, 2011, dated Feb. 23, 2015.

(56) References Cited

OTHER PUBLICATIONS

Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office Action for U.S. Appl. No. 13/092,460, filed Apr. 22, 2011, dated Mar. 13, 2015.
Office Action for U.S. Appl. No. 13/092,752, filed Apr. 22, 2011, dated Feb. 27, 2015.
Office Action for U.S. Appl. No. 13/425,238, filed Mar. 20, 2012, dated Mar. 12, 2015.
Office Action for U.S. Appl. No. 13/425,238, dated Mar. 12, 2015.
Office Action for U.S. Appl. No. 13/786,328, filed Mar. 5, 2013, dated Mar. 13, 2015.
Office Action for U.S. Appl. No. 14/577,785, filed Dec. 19, 2014, dated Apr. 13, 2015.
Rosen, E. et al., "BGP/MPLS VPNs", Mar. 1999.
Office action dated Jun. 8, 2015, U.S. Appl. No. 14/178,042, filed Feb. 11, 2014.
Office Action dated May 21, 2015, U.S. Appl. No. 13/288,822, filed Nov. 3, 2011.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated Apr. 1, 2015 U.S. Appl. No. 13/656,438, filed Oct. 19, 2012.
Office Action Dated Jun. 10, 2015, U.S. Appl. No. 13/890,150, filed May 8, 2013.
Mahalingam "VXLAN: A Framework for Overlaying Virtualized Layer 2 Networks over Layer 3 Networks" Oct. 17, 2013 pp. 1-22, Sections 1, 4 and 4.1.
Siamak Azodolmolky et al. "Cloud computing networking: Challenges and opportunities for innovations", IEEE Communications Magazine, vol. 51, No. 7, Jul. 1, 2013.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438 filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.2 Dec. 5, 2011.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
"Network based IP VPN Architecture using Virtual Routers" Paul Knight et al.
Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.
Office Action for U.S. Appl. No. 14/662,095, dated Mar. 24, 2017.
Office Action for U.S. Appl. No. 15/005,967, dated Mar. 31, 2017.
Office Action for U.S. Appl. No. 15/215,377, dated Apr. 7, 2017.
Office Action for U.S. Appl. No. 13/098,490, dated Apr. 6, 2017.
Office Action for U.S. Appl. No. 14/662,092, dated Mar. 29, 2017.
Office Action for U.S. Appl. No. 14/660,803, dated May 17, 2017.
Office Action for U.S. Appl. No. 14/488,173, dated May 12, 2017.
Office Action for U.S. Appl. No. 13/288,822, dated May 26, 2017.
Office Action for U.S. Appl. No. 14/329,447, dated Jun. 8, 2017.
Office Action for U.S. Appl. No. 14/817,097, dated May 4, 2017.
Office Action for U.S. Appl. No. 14/872,966, dated Apr. 20, 2017.
Office Action for U.S. Appl. No. 14/680,915, dated May 3, 2017.
Office Action for U.S. Appl. No. 14/792,166, dated Apr. 26, 2017.
Office Action for U.S. Appl. No. 14/510,913, dated Jun. 30, 2017.
Office Action for U.S. Appl. No. 15/005,946, dated Jul. 14, 2017.
Office Action for U.S. Appl. No. 13/092,873, dated Jul. 19, 2017.
Office Action for U.S. Appl. No. 15/047,539, dated Aug. 7, 2017.
Office Action for U.S. Appl. No. 14/830,035, dated Aug. 28, 2017.
Office Action for U.S. Appl. No. 13/098,490, dated Aug. 24, 2017.
Office Action for U.S. Appl. No. 13/786,328, dated Aug. 21, 2017.

* cited by examiner

DISTRIBUTED BIDIRECTIONAL FORWARDING DETECTION PROTOCOL (D-BFD) FOR CLUSTER OF INTERCONNECTED SWITCHES

RELATED APPLICATIONS

This application claims the benefit of:

U.S. Provisional Application No. 62/099,983, titled "Distributed Bidirectional Forwarding Detection Protocol (D-BFD) For VCS Cluster," by inventors Pavan Kumar, Prabu Thayalan, Shivalingayya Chikkamath, and Mythilikanth Raman, filed 5 Jan. 2015, the disclosure of which is incorporated by reference herein.

The present disclosure is related to:

U.S. patent application Ser. No. 13/087,239, titled "Virtual Cluster Switching," by inventors Suresh Vobbilisetty and Dilip Chatwani, filed 14 Apr. 2011 (hereinafter U.S. patent application Ser. No. 13/087,239);

U.S. patent application Ser. No. 13/092,724, titled "Fabric Formation for Virtual Cluster Switching," by inventors Shiv Haris and Phanidhar Koganti, filed 22 Apr. 2011 (hereinafter U.S. patent application Ser. No. 13/092,724"); and U.S. Pat. No. 8,665,886, titled "Redundant Host Connection in a Routed Network," by inventors Somesh Gupta, Anoop Ghanwani, Phanidhar Koganti, and Shunjia Yu, issued 4 Mar. 2014 (hereinafter "U.S. Pat. No. 8,665,886"), the disclosures of which are incorporated by reference herein.

BACKGROUND

Field

The present disclosure relates to network management. More specifically, the present disclosure relates to a method and system for detecting a forwarding path failure based on a bidirectional forwarding detection (BFD) protocol in a distributed architecture.

Related Art

The exponential growth of the Internet has made it a popular delivery medium for multimedia applications, such as video on demand and television. Such applications have brought with them an increasing demand for bandwidth. As a result, equipment vendors race to build larger and faster switches with versatile capabilities, such as service insertion and provisioning, to move more traffic efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

A flexible way to improve the scalability of a switch system is to build a fabric switch. A fabric switch is a collection of individual member switches, e.g., a network of interconnected switches. These member switches form a single, logical switch that can have an arbitrary number of ports and an arbitrary topology. As demands grow, customers can adopt a "pay as you grow" approach to scale up the capacity of the fabric switch.

Meanwhile, layer-2 (e.g., Ethernet) switching technologies continue to evolve. More routing-like functionalities, which have traditionally been the characteristics of layer-3 (e.g., Internet Protocol or IP) networks, are migrating into layer-2. As Internet traffic is becoming more diverse, virtual computing in a network is becoming progressively more important as a value proposition for network architects. For example, a traditional bidirectional forwarding detection (BFD) protocol is a network protocol used to rapidly detect faults between adjacent forwarding engines, e.g., two forwarding engines connected by a link or two connected interfaces. A BFD session can be established between two endpoints that exchange BFD control packets over a particular link at a pre-negotiated interval. BFD is described in RFC 5880, "Bidirectional Forwarding Detection," by D. Katz and D. Ward, June 2010, the entirety of which is hereby incorporated by reference. However, some issues remain unsolved when using BFD as a fault detection mechanism in a distributed architecture such as a fabric switch or a virtual cluster switch (VCS) cluster.

SUMMARY

One embodiment of the present invention provides a switch. The switch comprises one or more ports adapted to receive packets, wherein the switch is a member of a network of interconnected switches. The switch also comprises a path monitoring apparatus adapted to, in response to a control packet associated with a session within a predetermined time interval, set a receive indicator for the switch to an active state. The path monitoring apparatus is also adapted to, in response to absence of the control packet associated with the session within the predetermined time interval, set the receive indicator for the switch to an inactive state. The path monitoring apparatus is also adapted to set a path state associated with the session based on the receive indicators for the switch and one or more other member switches. The switch also comprises a broadcast apparatus adapted to broadcast at least the receive indicator for the switch to one or more other member switches.

In a variation on this embodiment, the path monitoring apparatus is further adapted to, in response to a notification message from another member switch that includes the receive indicator for the other member switch: store the receive indicator for the other switch; and set the path state based on the receive indicator for the other switch.

In a further variation, the path monitoring apparatus is further adapted to, in response to a notification message from another member switch that includes session parameters and a create command, create a session database based on the session parameters.

In a further variation, the switch further comprises a session database, which indicates parameters for the session and includes one or more of: a session identifier; a source address; a destination address; a master switch identifier; receive indicators for the switch and the other member switches; and the path state for the session.

In a further variation, the ports are adapted to receive packets based on one or more of: a virtual extensible local area network protocol; a generic routing encapsulation protocol; and a tunneling protocol based on encapsulation of a layer-2 compatible frame.

In a further variation, the broadcast apparatus is further adapted to broadcast based on an Internet Protocol.

In a further variation, the switch and the other member switches are each a virtual routing Bridge (RBridge) that belongs to the network of interconnected switches. A switch identifier for an RBridge is an RBridge identifier associated with a respective switch. The broadcast apparatus is further adapted to broadcast based on a Transparent Interconnection of Lots of Links protocol.

In a variation on this embodiment, the switch is designated as a master and further comprises a session initiator apparatus adapted to establish the session that corresponds to a path between the network of interconnected switches and a destination endpoint based on session parameters, wherein the session is based on a bidirectional forwarding detection protocol. The session initiator apparatus is also adapted to create the session database based on the session parameters. The broadcast apparatus is further adapted to broadcast the session parameters and a create command to the other member switches.

In a further variation on this embodiment, the switch comprises a forwarding apparatus adapted to construct a control packet that is destined for the destination endpoint. The path monitoring apparatus is further adapted to, in response to determining that the path state is inactive, initiate a tear down of the path.

In a further variation, the switch comprises a link tracking apparatus adapted to determine a status of all interfaces connecting to a next-hop core router. In response to determining that the status is down, the link tracking apparatus is adapted to initiate a failover to one of the other member switches and designate a new master. The broadcast apparatus is further adapted to broadcast a message to the other member switches to remove the switch from an active load balancing scheme.

In a further variation, the link tracking apparatus is further adapted to determine that the status of at least one of the interfaces is up. The broadcast apparatus is further adapted to broadcast a message to the other member switches to add the switch to the active load balancing scheme.

In a further variation, the link tracking apparatus is further adapted to determine that the master is unable to transmit a control packet. The path monitoring apparatus is further adapted to trigger a failover to one of the other member switches.

BRIEF DESCRIPTION OF THE FIGURES

In the figures, like reference numerals refer to the same figure elements.

DETAILED DESCRIPTION

Figure 1A:
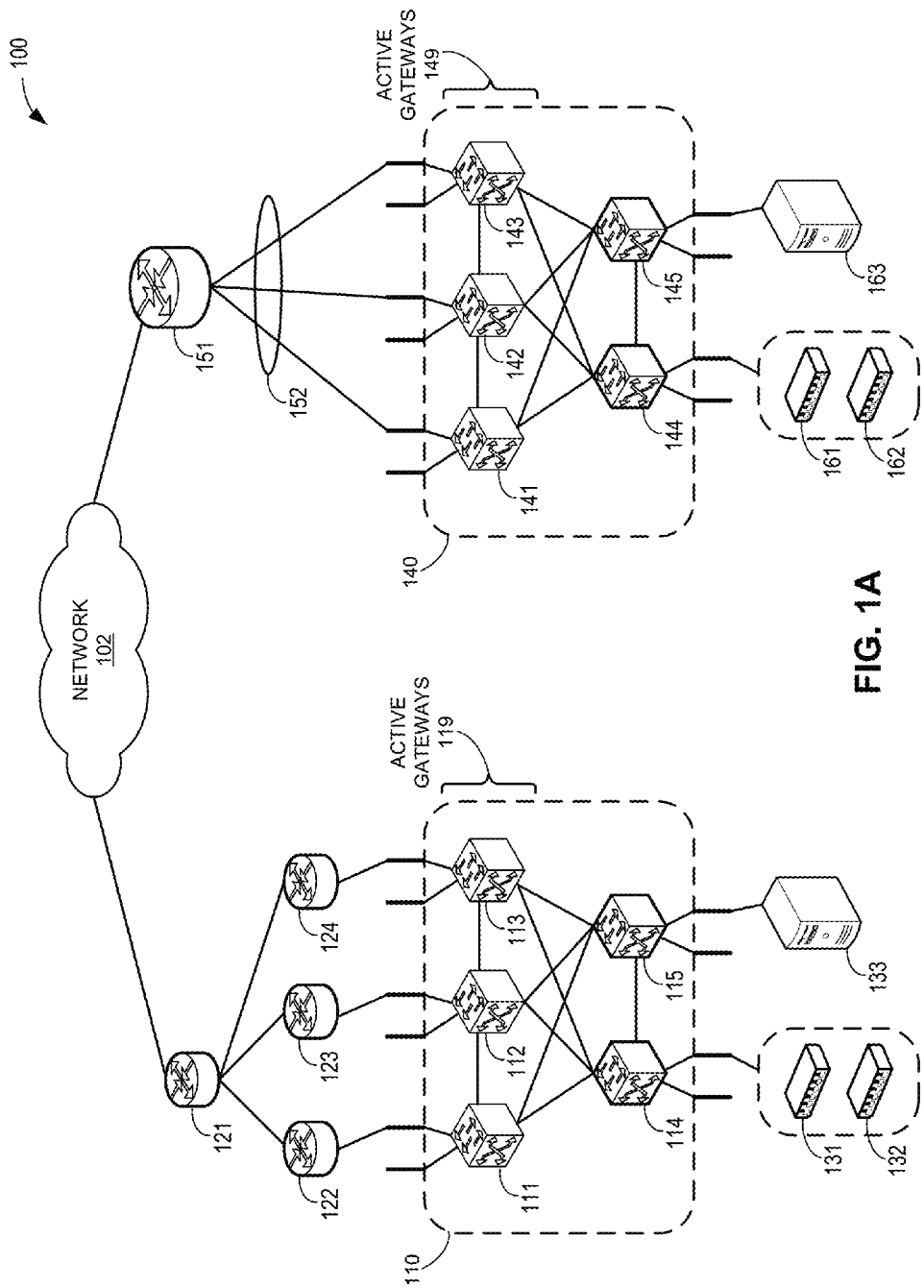
FIG. 1A illustrates an exemplary environment comprising a fabric switch capable of monitoring the health of an extension tunnel in a distributed architecture, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of monitoring the health of an extension tunnel in a distributed architecture (such as a fabric switch) based on BFD is solved by designating a master switch for a session, and allowing each member switch to synchronize and maintain its own session instance based on received BFD control packets. The master switch can establish a BFD session with a destination endpoint, broadcast session parameters to all other member switches, and transmit a BFD control packet at a predetermined interval to the destination endpoint. In a traditional point-to-point, non-distributed architecture, a single source node can establish a BFD session with a single destination endpoint. The source node sends a BFD control packet to a single destination node at a predetermined interval, and waits to receive (or not receive) the return BFD control packet, indicating an active (or inactive) path between the source and destination nodes. However, in a distributed architecture (such as a source fabric switch that includes multiple member switches), each member switch may need to establish individual BFD sessions with a single destination endpoint (or with multiple destination endpoints if the destination node is also a fabric switch) over each possible communication path. On a communication path, a destination endpoint can sit multiple hops away from the source fabric switch (e.g., on a data center core or a WAN), and member switches in a fabric switch can share a same virtual IP address. Thus, the number of established BFD sessions in a distributed architecture can grow exponentially with the number of virtual entity groups or virtual extensible local area network (VXLAN) tunnels configured with the same source virtual IP address.

Furthermore, because member switches of a fabric switch can share a virtual IP address and present a single logical switch view to the external network, a sending member switch can send a BFD control packet to a destination endpoint with a session identifier, which can be received by another (non-owner) member switch. The non-owner member switch can determine that the session identifier of the received BFD control packet does not match any session maintained by the non-owner switch, and the non-owner switch may discard the BFD control packet. The sending member switch, not having received the BFD control packet for the session, may falsely determine that the session is inactive, and initiate a tear down of the session even though a proper communication path exists via the non-owner member switch.

To address these inefficiencies, embodiments of the present invention provide a system that runs a BFD state machine on each member switch based on a forwarding path detection algorithm for BFD in a distributed architecture (herein referred to as a distributed bidirectional forwarding detection (D-BFD) protocol). The system designates a master switch ("BFD Master") for a particular BFD session, while allowing the remaining member switches ("BFD Backups") to act as backup switches for the same BFD session. The BFD Master can be elected based on parameters such as gateway priority configuration, number of active links, and/or next-hop reachability to the destination IP. Different BFD Masters can be elected for different sessions and can reside on any of the member switches. During operation, the BFD Master establishes a new BFD session with a destination endpoint using a unique session identifier for a pair of source and destination IP addresses. Before initiating the session, the BFD Master advertises parameters for the new session to all participating member switches in the D-BFD protocol, and all BFD Backups initialize a session instance based on the session parameters. The BFD Master then establishes a BFD session with the destination endpoint, and initializes its own session instance based on the session parameters.

The BFD Master sends a BFD control packet for the session at a predetermined time interval to the destination endpoint. Each member switch (e.g., the BFD Master and all BFD Backups) tracks reception of the return BFD control packet. Each member switch broadcasts a notification message to all other member switches upon receiving (or not receiving) the return BFD control packet within the predetermined time interval. Each member switch can update its own session instance by setting the state of a path (e.g., the particular BFD session) to an active or inactive state based on these notification messages. In this way, the BFD Master knows whether a particular BFD session is active or inactive, and can act accordingly. For example, if a BFD session is determined to be inactive, the BFD Master can initiate a tear down of the path. In some embodiments, the BFD Master can also track the status of interfaces connected to the BFD Master. If the status of all interfaces is determined to be down, the BFD Master can initiate a failover by designating a new master switch and notifying all other member switches of this event. Tracking links and initiating failover is described below in relation to FIG. 6.

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

It should also be noted that a fabric switch is distinct from a virtual local area network (VLAN). A fabric switch can accommodate a plurality of VLANs. A VLAN is typically identified by a VLAN tag. In contrast, the fabric switch is identified by a fabric identifier (e.g., a cluster identifier), which is assigned to the fabric switch. A respective member switch of the fabric switch is associated with the fabric identifier. In some embodiments, a fabric switch identifier is pre-assigned to a member switch. As a result, when the switch joins a fabric switch, other member switches identify the switch to be a member switch of the fabric switch.

In this disclosure, the term "fabric switch" refers to a number of interconnected physical switches which form a single, scalable network of switches. The member switches of the fabric switch may operate as individual switches. The member switches of the fabric switch can also operate as a single, logical switch in the provision and control plane, the data plane, or both. Any new switch may join or leave the fabric switch in "plug-and-play" mode without any manual configuration. A fabric switch appears as a single, logical switch to an external device. "Fabric switch" should not be interpreted as limiting embodiments of the present invention to a plurality of switches operating as a single, logical switch. The term "fabric switch" can also refer to a network of interconnected switches. In some further embodiments, the fabric switch can be a Transparent Interconnection of Lots of Links (TRILL) network and a respective member switch of the fabric switch is a TRILL routing bridge (RBridge). In some embodiments, the fabric switch can be a layer-3 (e.g., Internet Protocol or IP) network and a member switch can be a layer-3 node (e.g., capable of routing based on a routing protocol).

Although the present disclosure is presented using examples based on an encapsulation protocol, embodiments of the present invention are not limited to networks defined using one particular encapsulation protocol associated with a particular Open System Interconnection Reference Model (OSI reference model) layer. For example, embodiments of the present invention can also be applied to a multi-protocol label switching (MPLS) network. In this disclosure, the term "encapsulation" is used in a generic sense, and can refer to encapsulation in any networking layer, sub-layer, or a combination of networking layers.

The term "end device" can refer to any device external to a network (e.g., does not perform forwarding in that network). Examples of an end device include, but are not limited to, a physical or virtual machine, a conventional layer-2 switch, a layer-3 router, or any other type of network device. Additionally, an end device can be coupled to other switches or hosts further away from a layer-2 or layer-3 network. An end device can also be an aggregation point for a number of network devices to enter the network. An end device hosting one or more virtual machines can be referred to as a host machine. In this disclosure, the terms "end device," "endpoint," and "host machine" are used interchangeably.

The term "VLAN" is used in a generic sense, and can refer to any virtualized network. Any virtualized network comprising a segment of physical networking devices, software network resources, and network functionality can be can be referred to as a "VLAN." "VLAN" should not be interpreted as limiting embodiments of the present invention to layer-2 networks. "VLAN" can be replaced by other terminologies referring to a virtualized network or network segment, such as "Virtual Private Network (VPN)," "Virtual Private LAN Service (VPLS)," or "Easy Virtual Network (EVN)."

The term "packet" refers to a group of bits that can be transported together across a network. "Packet" should not be interpreted as limiting embodiments of the present invention to layer-3 networks. "Packet" can be replaced by other terminologies referring to a group of bits, such as "frame," "cell," or "datagram."

The term "switch" is used in a generic sense, and can refer to any standalone or fabric switch operating in any network layer. "Switch" can be a physical device or software running on a computing device. "Switch" should not be interpreted as limiting embodiments of the present invention to layer-2 networks. Any device that can forward traffic to an external device or another switch can be referred to as a "switch." Examples of a "switch" include, but are not limited to, a layer-2 switch, a layer-3 router, a TRILL RBridge, or a fabric switch comprising a plurality of similar or heterogeneous smaller physical switches.

The term "edge port" refers to a port on a network which exchanges data frames with a device outside of the network (i.e., an edge port is not used for exchanging data frames with another member switch of a network). The term "inter-switch port" refers to a port which sends/receives data frames among member switches of the network. A link between inter-switch ports is referred to as an "inter-switch link." The terms "interface" and "port" are used interchangeably.

The term "RBridge" refers to routing bridges, which are bridges implementing the TRILL protocol as described in Internet Engineering Task Force (IETF) Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

The term "switch identifier" refers to a group of bits that can be used to identify a switch. Examples of a switch identifier include, but are not limited to, a media access control (MAC) address, an Internet Protocol (IP) address, an RBridge identifier, or a combination thereof. In this disclosure, "switch identifier" is used as a generic term, is not limited to any bit format, and can refer to any format that can identify a switch. If the switch is an RBridge, the switch identifier can be an "RBridge identifier." The TRILL standard uses "RBridge ID" to denote a 48-bit Intermediate-System-to-Intermediate-System (IS-IS) ID assigned to an RBridge, and "RBridge nickname" to denote a 16-bit value that serves as an abbreviation for the "RBridge ID." The term "RBridge identifier" is used in a generic sense, is not limited to any bit format, and can refer to "RBridge ID," "RBridge nickname," or any other format that can identify an RBridge.

The terms "tunnel" or "extension tunnel" refer to a data communication where one or more networking protocols are encapsulated using another networking protocol. Although the present disclosure is presented using examples based on a layer-3 encapsulation of a layer-2 protocol, "tunnel" should not be interpreted as limiting embodiments of the present invention to layer-2 and layer-3 protocols. A "tunnel" can be established for and using any networking layer, sub-layer, or a combination of networking layers.

Network Architecture

FIG. 1A illustrates an exemplary environment 100 comprising a fabric switch capable of monitoring the health of an extension tunnel in a distributed architecture, in accordance with an embodiment of the present invention. Environment 100 can include fabric switches 110 and 140, which include member switches 111-115 and member switches 141-145, respectively. Some of member switches 111-115 can participate as switches in active gateways 119 (e.g., member switches 111, 112, and 113) and some of member switches 141-145 can participate in active gateways 149 (e.g., member switches 141-143).

Member switches in fabric switches 110 and 140 use edge ports to communicate with end devices and inter-switch ports to communicate with other member switches. For example, switch 114 is coupled to end devices 131 and 132 via an edge port, and to switch 115 via an inter-switch port. Switch 115 is coupled to an end device 133 via an edge port. Switches 111, 112 and 113 are coupled to end devices (e.g., routers) 122, 123, and 124, respectively, via edge ports. Routers 122, 123, and 124 can be coupled to an end device (e.g., a data center core router) 121, which can communicate over a network 102 with an end device (e.g., a data center core router) 151.

Communication between member switches via inter-switch ports can be based on IP. In some embodiments, fabric switches 110 and 140 are each a layer-3 (e.g., IP) network, switches 111-115 and switches 141-145 are layer-3 nodes, and data frames transmitted and received via inter-switch ports are encapsulated in IP headers. Communication between an end device and a member switch via an edge port can be based on Ethernet. For example, switch 115 can receive an Ethernet frame from end device 133 via an edge port. Switch 115 can encapsulate the Ethernet frame in an IP header (e.g., a layer-3 tunnel header) and forward the encapsulated packet to another member switch via an inter-switch port. It should be noted that the encapsulated packet can have an external Ethernet header for layer-2 forwarding. In some embodiments, fabric switches 110 and 140 are each a TRILL network, switches 111-115 and switches 141-145 are RBridges, and data frames transmitted and received via inter-switch ports are encapsulated in TRILL headers.

Member switches 141-143 can be coupled to router 151 via edge ports, whose corresponding links can be trunked in a virtual link aggregation group (VLAG) 152, as described in U.S. Pat. No. 8,665,886, titled "Redundant Host Connection in a Routed Network," which is incorporated by reference herein. Examples of end devices 121-124, 131-133, 151, and 161-163 include, but are not limited to, a layer-2 switch, layer-3 router, top-of-the-rack switch, and physical or virtual host machine.

Environment 100 can include multiple virtual tunnels between fabric switches 110 and 140 through network 102. Network 102 can be a layer-3 network (e.g., an IP network). Fabric switches 110 and 140 can each act as a VXLAN tunnel endpoint in a VXLAN-based communication. As depicted in FIG. 1A, multiple communication paths exist between member switches in fabric switches 110 and 140. In addition, as possible tunnel endpoints, member switches participating in active gateways 119 and 149 (e.g., switches 111-113 and 141-143, respectively) can implement functionality for both a virtual router redundancy protocol extended (VRRP-E) and a VXLAN protocol. This allows participating member switches 111-113 and 141-143 to equalize traffic load to route packets to the next-hop IP. Furthermore, VXLAN-encapsulated packets sent to a destination IP can be received by any participating member switch in a respective active gateway.

Figure 1B:
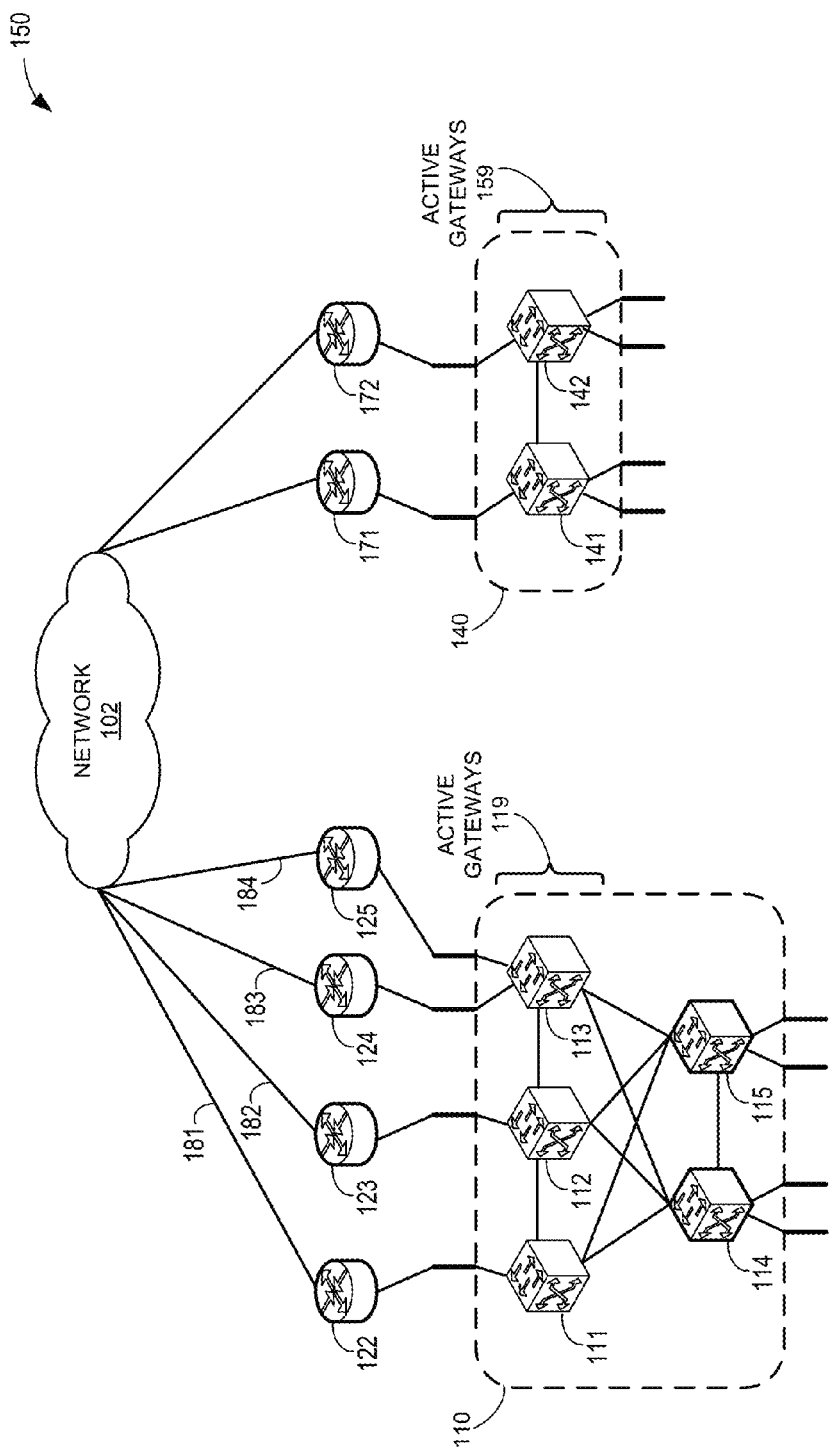
FIG. 1B illustrates an exemplary environment comprising a fabric switch capable of monitoring the health of an extension tunnel in a distributed architecture, in accordance with an embodiment of the present invention.

FIG. 1B illustrates an exemplary environment 150 comprising a fabric switch capable of monitoring the health of an extension tunnel in a distributed architecture, in accordance with an embodiment of the present invention. Environment 150 can include fabric switches 110 and 140, which include member switches 111-115 and member switches 141-142, respectively. Member switches 111-113 can participate in active gateways 119 and member switches 141-142 can participate in active gateways 159. Switches 111, 112, and 113 are coupled, respectively, to routers 122, 123, and 124 and 125, and switches 141 and 142 are coupled, respectively, to routers 171 and 172. Routers 122-125 can communicate over network 102 via links 181-184, respectively. Links 181-184 form part of four separate equal-cost multi-path (ECMP) routing paths to destination end device 140 (assuming fabric switch 140 is an end device). Using a standard BFD protocol may require that each of member switches 111-113 establish individual BFD sessions over each possible communication path with destination end device 140. As the number of paths increases, so does the number of BFD sessions, which can result in efficient network behavior.

In addition, if member switch 111 sends the BFD control packet, but the return BFD control packet is received by member switch 112, member switch 112 may discard the packet as not matching any of its current sessions, and member switch 111 may inaccurately declare the session to be inactive and initiate a tear down of the session. Furthermore, running multiple sessions for the same destination may not work when multiple communication paths overlap (as in FIG. 1A, where the first-hop router is the same for all BFD sessions). Also, some devices may not be able to support multiple BFD sessions for the same pair of source and destination IP addresses because of the additional overhead involved in maintaining redundant sessions.

Embodiments of the present invention address these problems by designating a master switch and allowing all member switches to maintain and synchronize its own instance for a specific BFD session based on the communication and method described below in relation to FIGS. 2A-2D.

Exemplary Communication in a Distributed Architecture

Figure 2A:
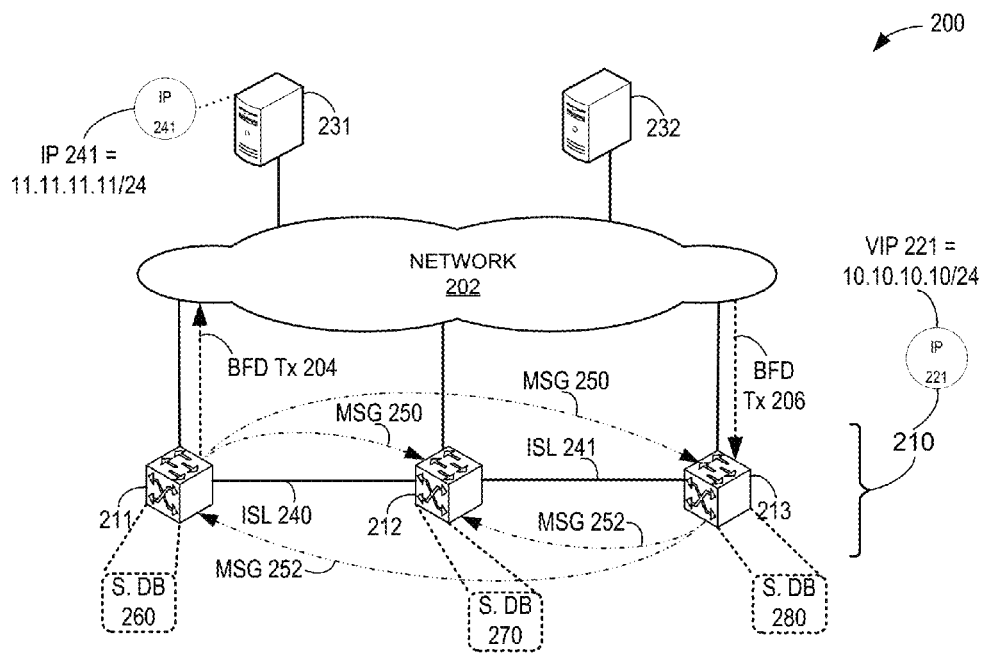
FIG. 2A illustrates an exemplary environment and communication in a fabric switch capable of monitoring the health of an extension tunnel in a distributed architecture, in accordance with an embodiment of the present invention.

FIG. 2A illustrates an exemplary environment 200 and communication in a fabric switch capable of monitoring the health of an extension tunnel in a distributed architecture, in accordance with an embodiment of the present invention. Environment 200 includes member switches 211, 212, and 213, which can be part of a fabric switch 210 (or a network 210 of interconnected switches). Switches 211-213 can communicate over a network 202 with end device 231 and 232. Switches 211, 212, and 213 maintain session databases 260, 270, and 280, respectively, which include parameters for multiple instances corresponding to BFD sessions. For example, switch 211 can maintain session database 260 which includes a session identifier field 261, a source IP address field 262, a destination IP address field 263, a master switch identifier field 264, a receive indicators field 265, and a path state 266.

During operation, switch 211 is elected as the BFD Master ("Master 211"). Switch 211 determines new session parameters, which can include, e.g., a session identifier, a desired or pre-negotiated transaction interval, a destination IP address, an initial state, a polling mechanism, a demand mode, and an echo receive interval. Master 211 broadcasts a notification message 250 that includes the session parameters and a "create" command to the other member switches (e.g., switches 212 and 213). Master 211 then establishes a BFD session that corresponds to the path between fabric switch 210 and destination endpoint 231. Master 211 also creates a session instance (e.g., session database 260) based on the session parameters (time T1). In FIG. 2A, Master 211 creates session database 260 with the following values: a session identifier with a value of "10"; a source IP address (e.g., a VIP 221) with a value of "10.10.10.10/24" which indicates the virtual IP address for fabric switch 210; a destination IP address (e.g., IP 241) with a value of "11.11.11.11/24" which indicates destination end device 231; a master switch identifier with a value of "211" which indicates Master 211; receive indicators for each of member switches 211-213, with initial values set to "0" to indicate an inactive receive state; and a path state with an initial value set to "0" to indicate an inactive path state.

Figure 2B:
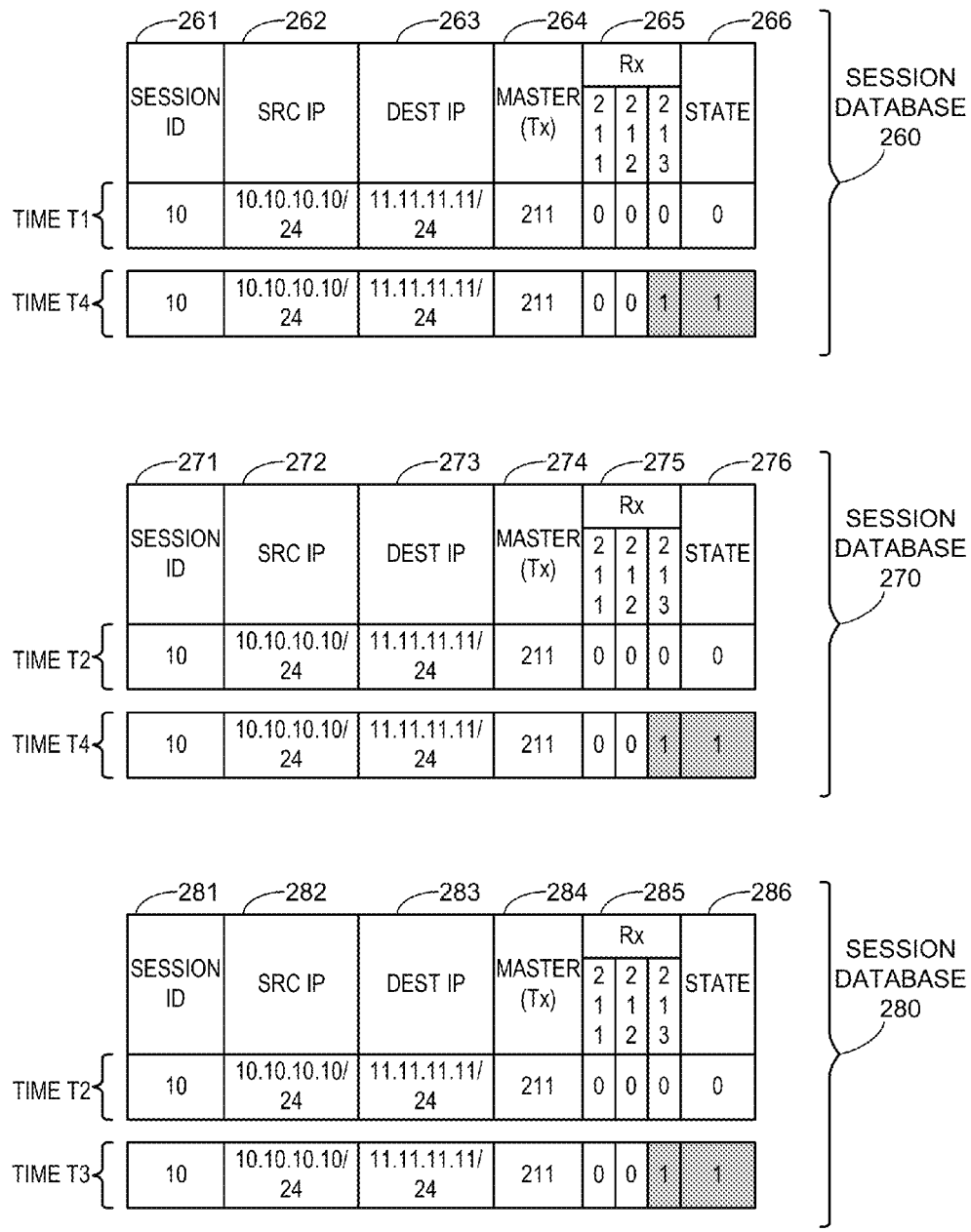
FIG. 2B illustrates exemplary database structures maintained by member switches of a fabric switch, corresponding to FIG. 2A, in accordance with an embodiment of the present invention.

FIG. 2B illustrates exemplary database structures maintained by member switches of a fabric switch, corresponding to FIG. 2A, in accordance with an embodiment of the present invention. Upon receiving notification message 250 (time T2), switches 212 and 213 each create a session instance based on the received session parameters and the create command (e.g., session databases 270 and 280, respectively), with the same values as session database 260 at time T1.

Master 211 then sends a BFD control packet ("BFD Tx") 204 to destination end device 231 for session ID=10. Subsequently, switch 213 receives BFD control packet ("BFD Rx") 206 from destination end device 231 for session ID=10 within the predetermined time interval. Switch 213 updates its local session database 280 by setting the receive indicator for switch 213 to an active state with a value of "1," and further sets the path state to an active state with a value of "1" (time T3). Switch 213 then broadcasts a notification message 252 to the other member switches (e.g., switch 212 and Master 211) indicating the session ID and an active receive indicator for switch 213. Upon receiving message 252, Master 211 and switch 212 update their respective local session databases 260 and 270 by setting the receive indicator for switch 213 to an active state with a value of "1," and further set the path state to an active state with a value of "1" (time T4). Because at least one forwarding path to the destination exists (e.g., the path from Master 211 to destination end device 231 to switch 213), the D-BFD session for session ID=10 is determined to be active. For example, if at least one of receive indicators 265 in session database 260 is active or set to a value of "1," Master 211 determines that the D-BFD session for the corresponding path is active. Note that if Master 211 receives BFD Rx 206, the system acts in similar fashion, with Master 211 setting its own receive indicator to active and updating its path state in its local session database, and subsequently broadcasting a notification message to the other member switches indicating its receive indicator as active, thus allowing all member switches to maintain and synchronize their own local session databases.

Figure 2C:
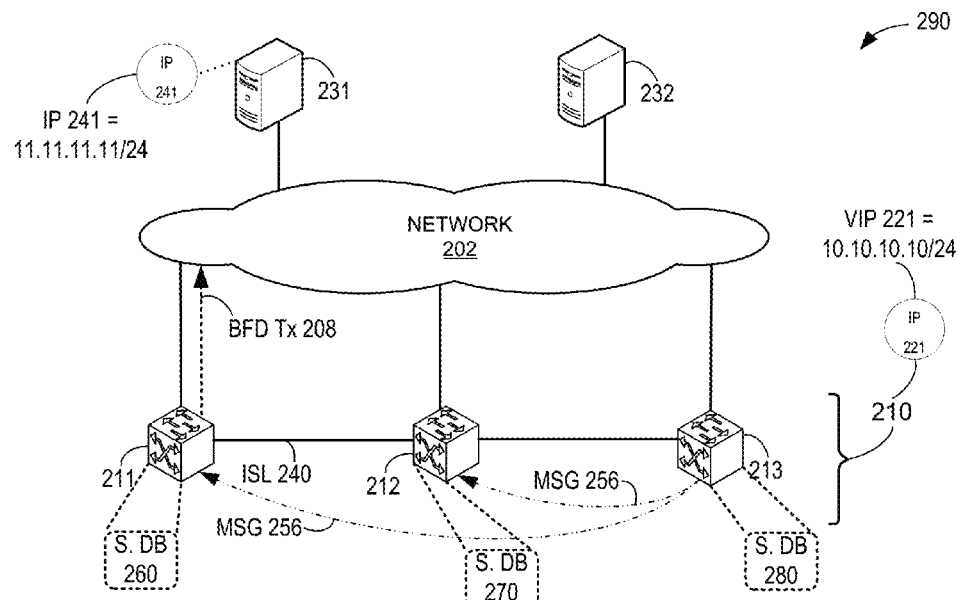
FIG. 2C illustrates an exemplary environment and communication in a fabric switch capable of monitoring the health of an extension tunnel in a distributed architecture, in accordance with an embodiment of the present invention.

A session is determined to be down or inactive only if the state of the D-BFD session is determined to be down or inactive on all member switches. For example, if all of receive indicators 265 in session database 260 are inactive or set to a value of "0," Master 211 determines that the D-BFD session for the corresponding path is inactive and can initiate a tear down of the path. FIG. 2C illustrates an exemplary environment 290 and communication in a fabric switch capable of monitoring the health of an extension tunnel in a distributed architecture, in accordance with an embodiment of the present invention. At time T4 (as depicted in FIGS. 2A-2C), all member switches of fabric switch 210 (e.g., Master 211 and switches 212 and 213) determine that the path state for BFD session ID=10 is active (e.g., "1"), as reflected in each of session databases 260, 270, and 280.

Figure 2D:
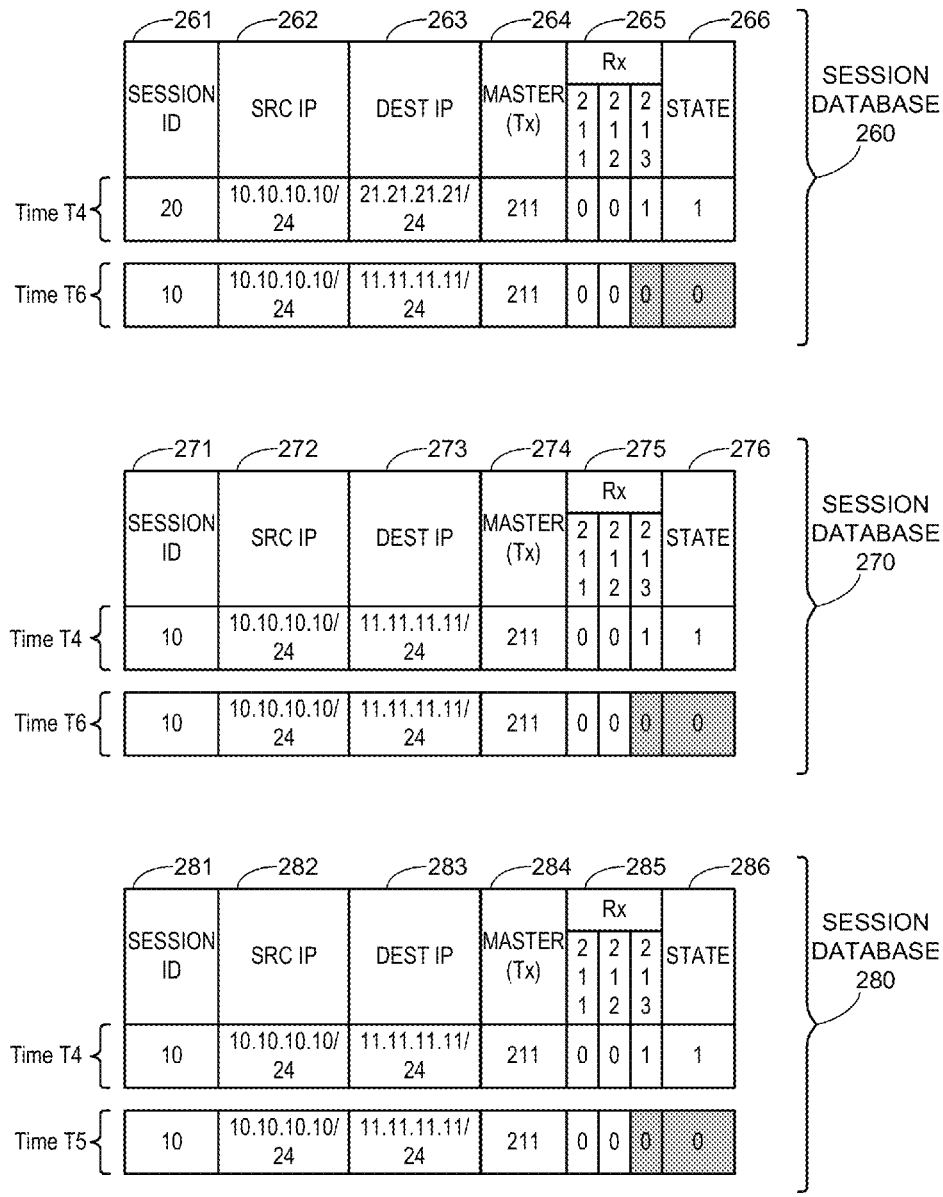
FIG. 2D illustrates exemplary database structures maintained by member switches of a fabric switch, corresponding to FIG. 2C, in accordance with an embodiment of the present invention.

FIG. 2D illustrates exemplary database structures maintained by member switches of a fabric switch, corresponding to FIG. 2C, in accordance with an embodiment of the present invention. At the end of the predetermined time interval, Master 211 can send a BFD Tx 208 to destination end device 231 for session ID=10. In some embodiments, Master 211 does not need to broadcast a notification message for subsequent BFD transmit control packets because each member switch creates and maintains an instance of the session database for the corresponding session ID in a previous operation. If switch 213 does not receive a BFD Rx from destination device 231 within the predetermined time interval, switch 213 updates its local session database 280 by setting the receive indicator for switch 213 to an inactive state with a value of "0," and further sets the path state to an inactive state with a value of "0" (time T5). Switch 213 then broadcasts a message 256 to the other member switches (e.g., Master 211 and switch 212) indicating the session ID and an inactive receive indicator for switch 213. Upon receiving message 256, Master 211 and switch 212 update their respective local session databases 260 and 270 by setting the receive indicator for switch 213 to an inactive state with a value of "0," and further set the path state to an inactive state with a value of "0" (time T6). Subsequently, Master 211 determines that the D-BFD session for session ID=10 is down and Master 211 can initiate a teardown of the D-BFD session.

Role of Master/Initiator D-BFD Switch

Figure 3:
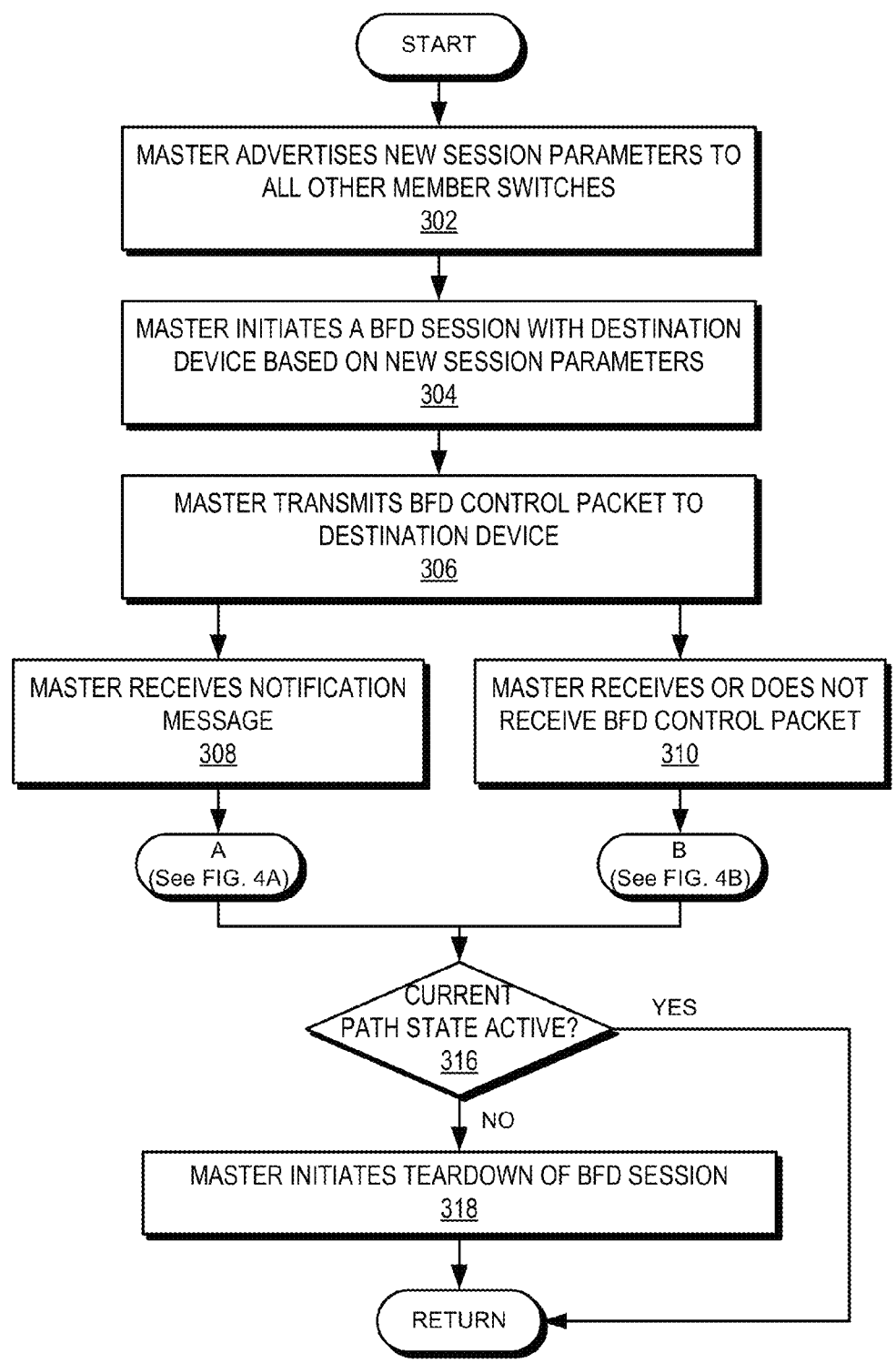
FIG. 3 presents a flowchart illustrating a process of a designated master switch of a fabric switch monitoring the health of an extension tunnel, in accordance with an embodiment of the present invention.

FIG. 3 presents a flowchart illustrating a process of a designated master switch of a fabric switch monitoring the health of an extension tunnel, in accordance with an embodiment of the present invention. During operation, the master switch advertises new session parameters to all other member switches of the fabric switch (operation 302). As described above, the session parameters can include, e.g., a session identifier, a desired or pre-negotiated transaction interval, a destination IP address, an initial state, a polling mechanism, a demand mode, and an echo receive interval. The master switch initiates a BFD session with a destination device based on the new session parameters (operation 304). The source IP address used to establish the session can be a virtual IP address of the master switch, and can be shared by all member switches of the fabric switch. The master switch transmits a BFD control packet to the destination device (operation 306), which can occur at the desired or pre-negotiated transaction interval. Subsequently, the master switch can receive a notification message from another member switch (operation 308), and the operation continues as depicted by Label A, described below in relation to FIG. 4A. Alternatively, the master switch can receive (or not receive) the return BFD control packet from the destination device (operation 310), and the operation continues as depicted by Label B, described below in relation to FIG. 4B.

Returning from the operations depicted by Labels A and B, respectively, in FIGS. 4A and 4B below, the master determines if the current path state is active (decision 316). If the path state as indicated in the local session database maintained by the master switch is active (e.g., state 266 of session database 260 of FIG. 2A indicates a value of "1" at time T4), the operation returns. If the path state is inactive (e.g., state 266 of session database 260 of FIG. 2C indicates a value of "0" at time T6), the master switch initiates a teardown of the corresponding BFD session (operation 318).

Member Switch Receives Notification Message and/or BFD Control Packet

Figure 4A:
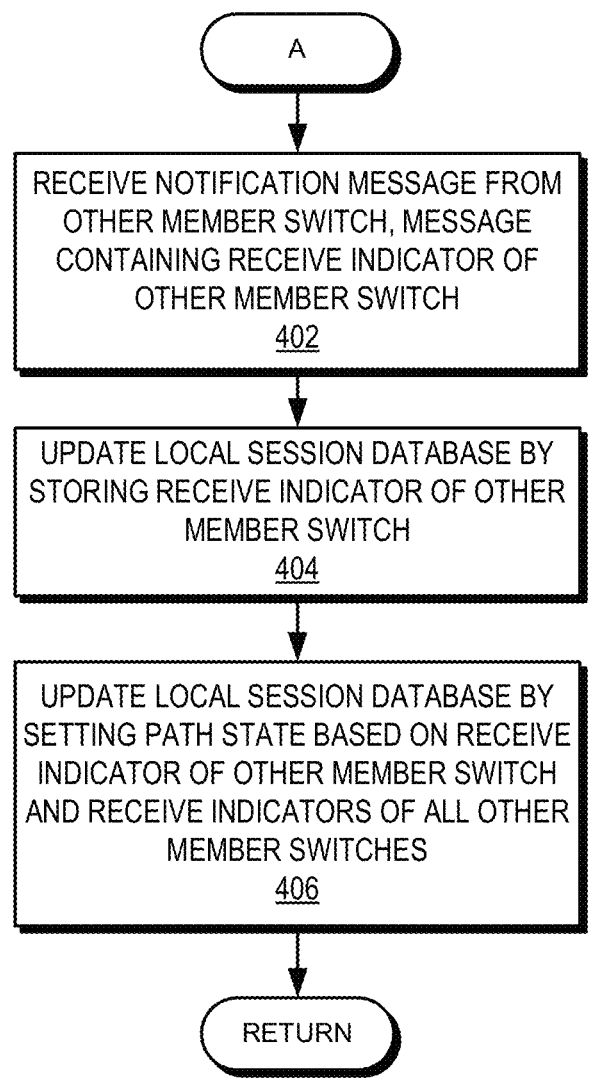
FIG. 4A presents a flowchart illustrating a process of a member switch of a fabric switch receiving a notification message from another member switch, in accordance with an embodiment of the present invention.

FIG. 4A presents a flowchart illustrating a process of a member switch of a fabric switch receiving a notification message from another member switch, in accordance with an embodiment of the present invention. During operation, a member switch ("receiving member switch") receives a notification message from another member switch, where the notification message contains the receive status ("receive indicator") of the other member switch for an established BFD session (operation 402). The receiving member switch can be the designated master switch or any other member switch of the fabric switch. The receiving member switch updates its local session database by storing the receive indicator (e.g., indicating a value of active or inactive) of the other member switch (operation 404). The receiving member switch also updates its local session database by setting the path state based on the receive indicator of the other member switch and the receive indicators of all other member switches (operation 406). If the receive indicator of any member switch is active, the corresponding BFD session is active or up. If the receive indicator of all member switches is inactive, the BFD session is inactive or down.

Figure 4B:
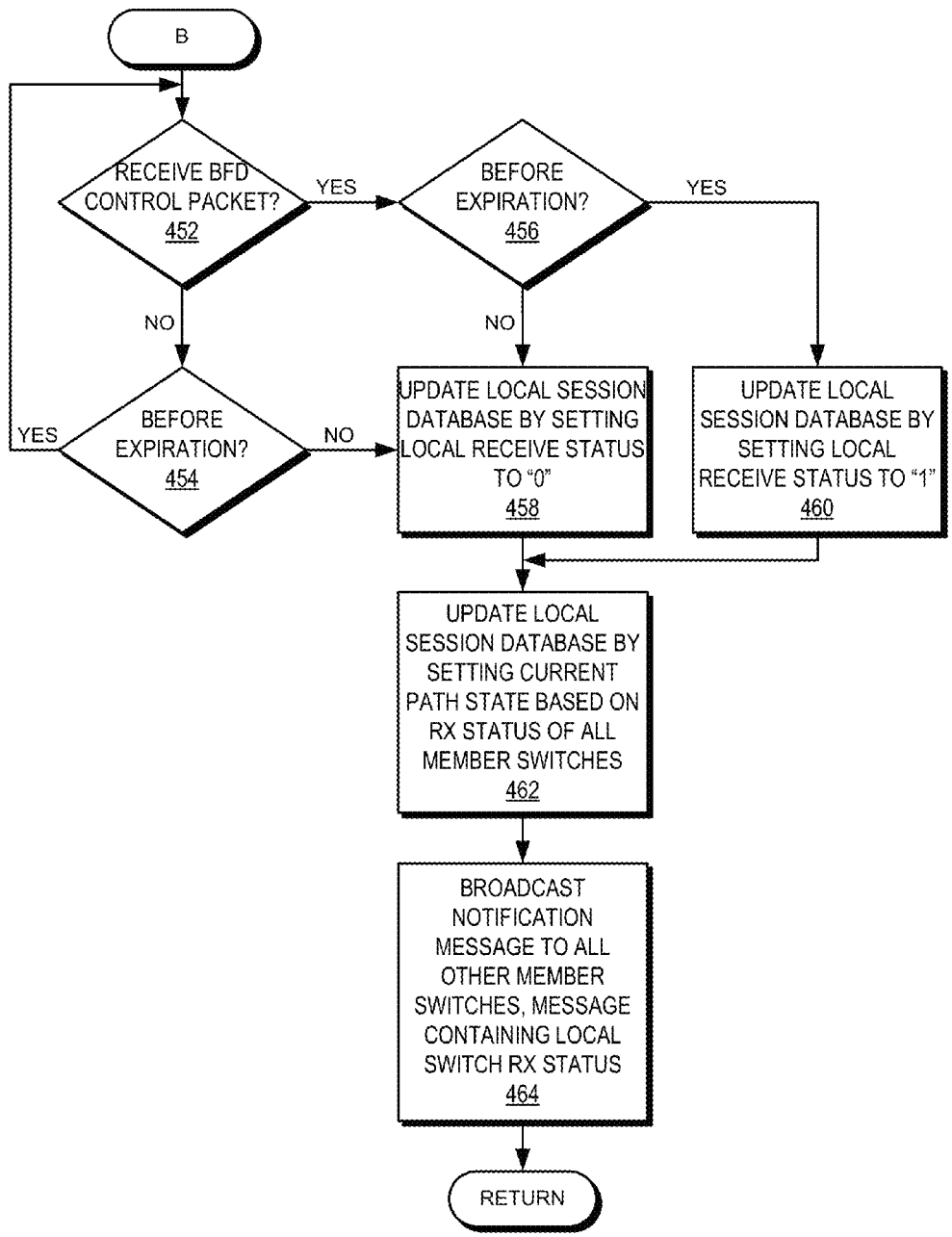
FIG. 4B presents a flowchart illustrating a process of a member switch of a fabric switch receiving or not receiving a BFD control packet from a destination device within a predetermined time interval, in accordance with an embodiment of the present invention.

FIG. 4B presents a flowchart illustrating a process of a member switch of a fabric switch receiving or not receiving a BFD control packet from a destination device within a predetermined time interval, in accordance with an embodiment of the present invention. During operation, a member switch determines whether it receives a BFD control packet (decision 452). If the member switch does not receive a BFD control packet, the member switch determines whether the current time is within the predetermined time interval or before expiration of the time interval (decision 454). If the current time is before the expiration of the time interval (e.g., within the time interval), the operation returns to operation 452. If the current time is not before the expiration of the time interval (e.g., after the expiration of the time interval), the member switch updates its local session database by setting its own receive status to inactive or "0" (operation 458).

If the member switch does receive a BFD control packet (decision 452), the member switch determines whether the current time is within the predetermined time interval or before expiration of the time interval (decision 456). If the current time is before the expiration of the time interval (e.g., within the time interval), the member switch updates its local session database by setting its own receive status to active or "1" (operation 460). If the current time is not before the expiration of the time interval (e.g., after the expiration of the time interval), the member switch updates its local session database by setting its own receive status to inactive or "0" (operation 458).

Subsequently, the member switch updates the local session database by setting the current path state based on the receive indicators of all member switches (operation 462). The member switch also broadcasts a notification message to all other member switches, where the notification message contains the receive indicator or receive status of the local switch (operation 464).

Role of Master/Initiator D-BFD Switch

Figure 5:
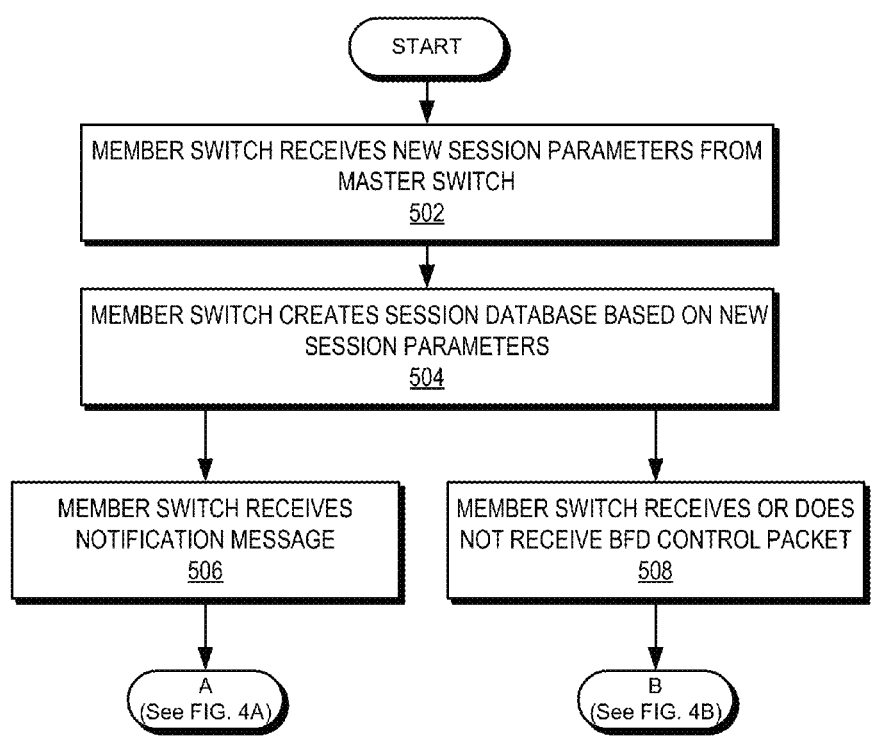
FIG. 5 presents a flowchart illustrating a process of a member switch of a fabric switch monitoring the health of an extension tunnel, in accordance with an embodiment of the present invention.

FIG. 5 presents a flowchart illustrating a process of a member switch of a fabric switch monitoring the health of an extension tunnel, in accordance with an embodiment of the present invention. During operation, a member switch ("receiving member switch") receives new session parameters from a master switch (operation 502). In some embodiments, the member switch can receive a "create" command from the master switch in conjunction with the new session parameters. The member switch then creates a session database (e.g., instantiates a session instance) based on the new session parameters (operation 504). Subsequently, the member switch can receive a notification message from another member switch (operation 506), and the operation continues as depicted by Label A, described above in relation to FIG. 4A. Alternatively, the member switch can receive (or not receive) the return BFD control packet from the destination device (operation 508), and the operation continues as depicted by Label B, described above in relation to FIG. 4B.

Tracking Links and Initiating Failover

Figure 6:
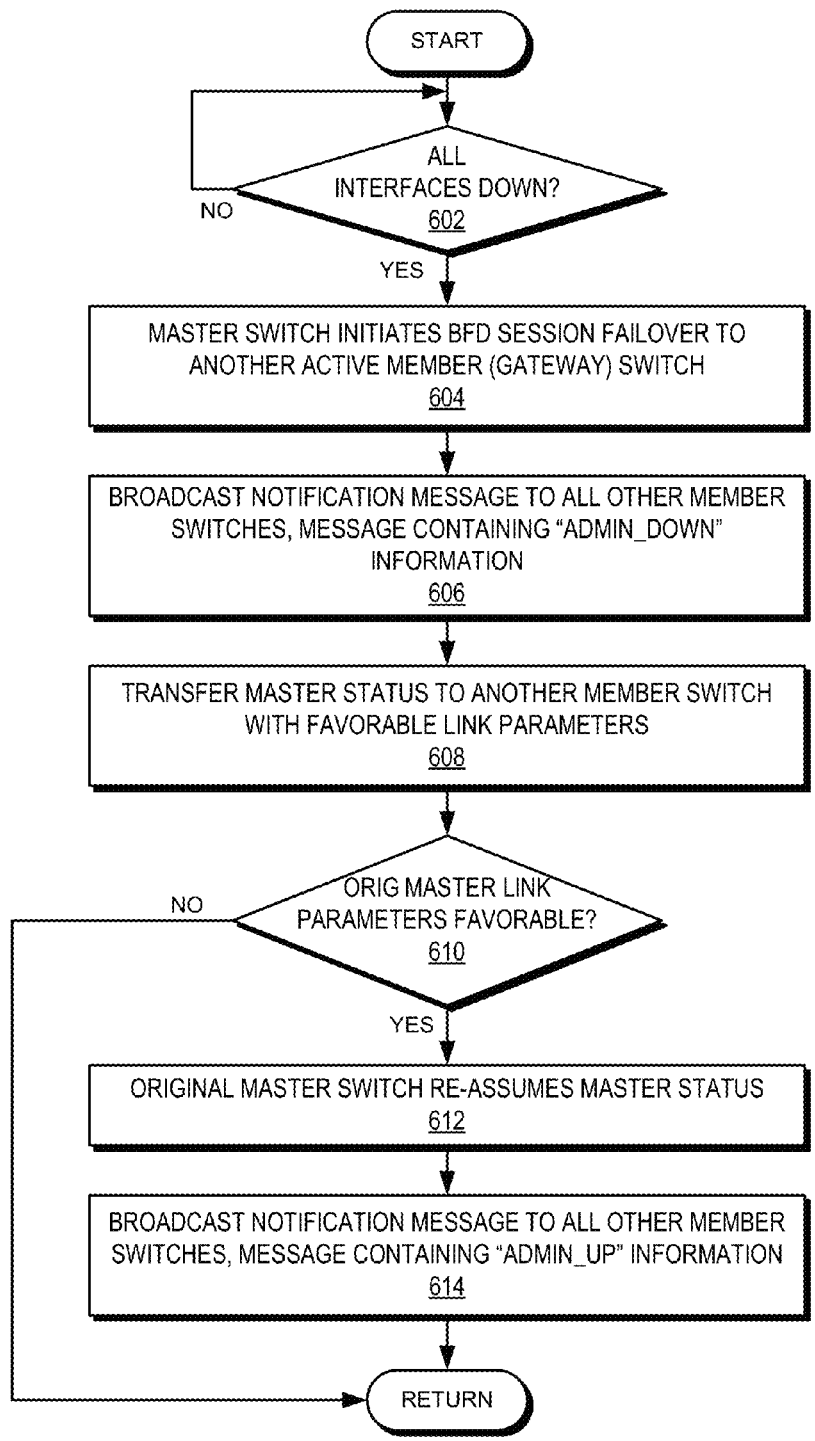
FIG. 6 presents a flowchart illustrating a process of a master switch for tracking links and initiating failover, in accordance with an embodiment of the present invention.

FIG. 6 presents a flowchart illustrating a process of a master switch for tracking links and initiating failover, in accordance with an embodiment of the present invention. During operation, the "original" master switch determines if all interfaces connecting to the fabric switch are down (decision 602). If all interfaces are not down (e.g., there is at least one interface available and active to carry data between the fabric switch and the destination device), the system returns to operation 602. If all interfaces are down, the original master switch initiates a BFD session failover to another member switch (e.g., a member switch participating in the same active gateway) (operation 604). The original master switch can remove itself from an active load balancing scheme by broadcasting a notification message to all other member switches, where the notification message contains information indicating that the administrator is down (e.g., "admin_down") (operation 606). The system elects a "new" master switch that has favorable link parameters. In some embodiments, the system uses the same parameters to elect the new master switch as it does to initially elect the original master switch. The original master switch then transfers master status to the new master switch (operation 608). The new master switch can thus continue transmission of the BFD control packets, providing a seamless transition in the event of link failure.

If the original link parameters become favorable (e.g., the system determines that the interfaces connecting from the original master switch to the fabric switch are up or otherwise determined to be favorable) (decision 610), the system can re-transfer master status by allowing the original master switch to re-assume master status (operation 612). The original master switch broadcasts a notification message to all other member switches, where the notification message contains information indicating that the administrator is up (e.g., "admin_up") (operation 614). Member switches participating in active gateways can send "admin_down" and "admin_up" messages to aid in tracking links.

New Switch Joins or Leaves a Fabric Switch

Figure 7A:
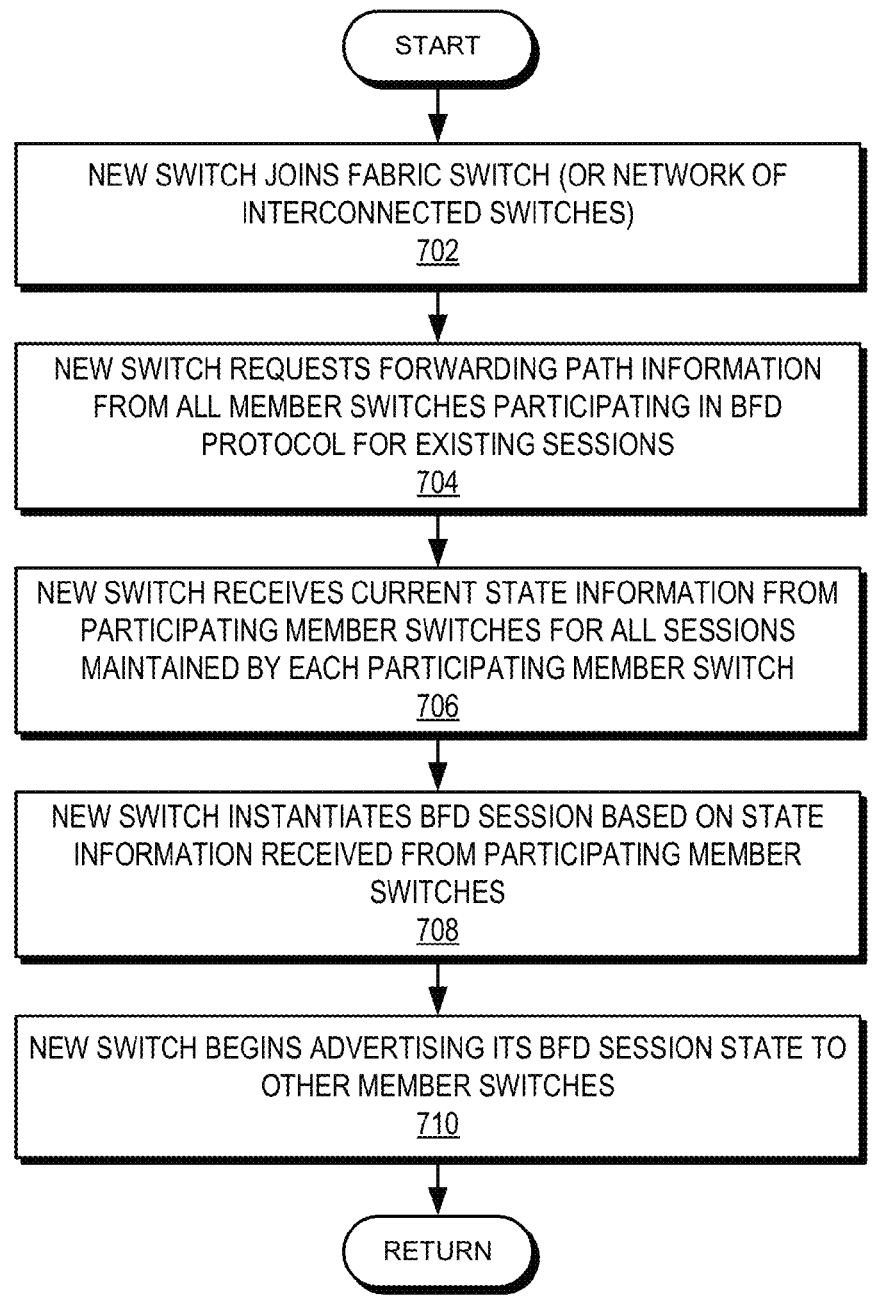
FIG. 7A presents a flowchart illustrating a process of a switch joining a fabric switch, in accordance with an embodiment of the present invention.

FIG. 7A presents a flowchart illustrating a process of a switch joining a fabric switch, in accordance with an embodiment of the present invention. During operation, a new switch joins a fabric switch (or a network of interconnected switches) (operation 702). The new switch requests forwarding path information from all member switches participating in the BFD protocol for existing sessions (operation 704). The new switch then receives current state information from all participating member switches for all sessions maintained by each participating member switch (operation 706). The current state information can include one or more of: negotiated and configured BFD session parameters; an indicator of an active or inactive session state (e.g., path state); and information regarding the current BFD Master for a particular session. The new switch instantiates a BFD session based on the state information received from the participating member switches (operation 708). Subsequently, the new switch begins advertising its BFD session state to the other participating member switches (operation 710).

Figure 7B:
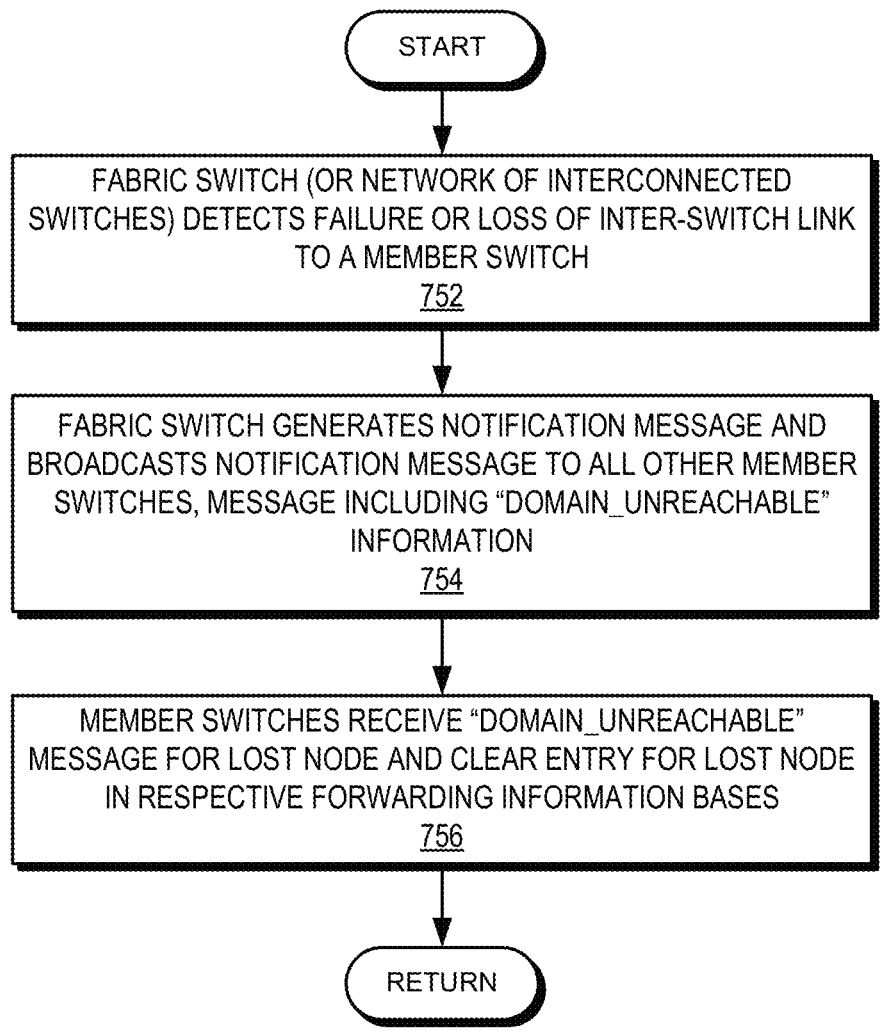
FIG. 7B presents a flowchart illustrating a process of a member switch leaving a fabric switch, in accordance with an embodiment of the present invention.

FIG. 7B presents a flowchart illustrating a process of a member switch leaving a fabric switch, in accordance with an embodiment of the present invention. During operation, the fabric switch (or network of interconnected switches) detects the failure or loss of an inter-switch link to a member switch (operation 752). The fabric switch generates a notification message and broadcasts the notification to all other member switches, where the notification message contains information indicating the failure (e.g., "domain_unreachable") (operation 754). The other member switches receive the domain_unreachable notification message for the lost member switch, and clear the entry for the lost node in their respective forwarding information databases (operation 756).

Exemplary Switch

Figure 8:
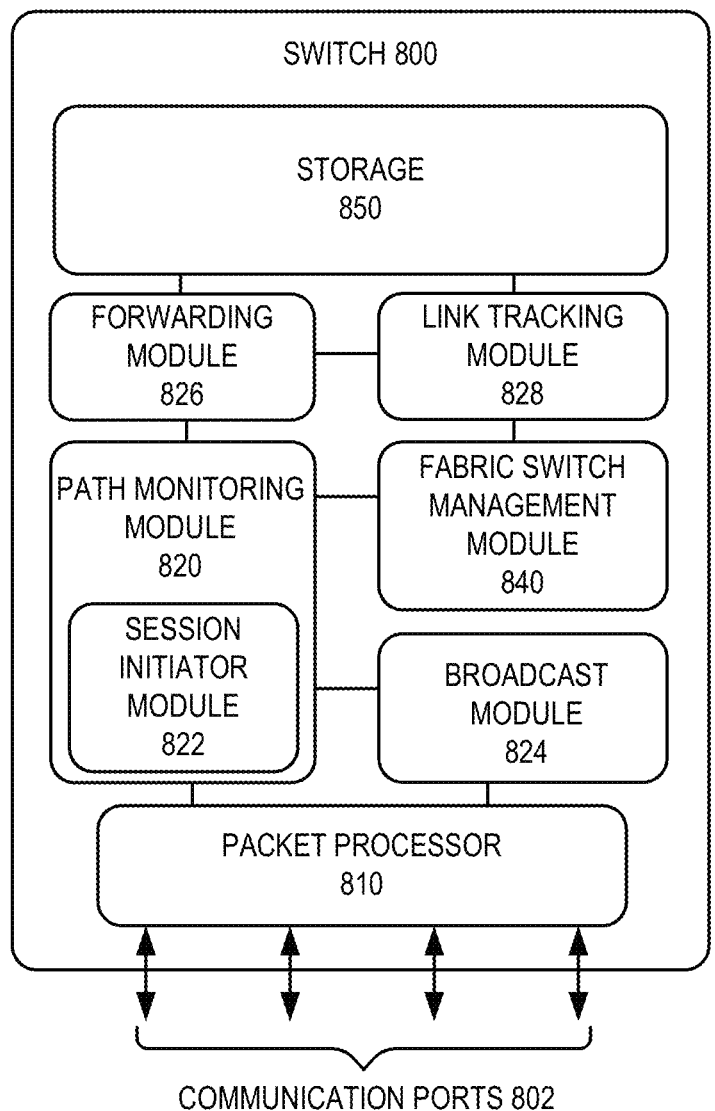
FIG. 8 illustrates an exemplary switch capable of monitoring the health of an extension tunnel in a distributed architecture, in accordance with an embodiment of the present invention.

FIG. 8 illustrates an exemplary switch capable of monitoring the health of an extension tunnel in a distributed architecture, in accordance with an embodiment of the present invention. In this example, a switch 800 includes a number of communication ports 802, a path monitoring module 820, a session initiator module 822, a broadcast module 824, a forwarding module 826, a link tracking module 828, and a storage 850. In some embodiments, switch 800 may maintain a membership in a fabric switch, wherein switch 800 also includes a fabric switch management module 840. Fabric switch management module 840 maintains a configuration database in storage 850 that maintains the configuration state of a respective switch within the fabric switch. Fabric switch management module 840 maintains the state of the fabric switch, which is used to join other switches. Under such a scenario, communication ports 802 can include inter-switch communication channels for communication within a fabric switch. This inter-switch communication channel can be implemented via a regular communication port and based on any open or proprietary format. Each of modules 820, 822, 824, 826, 828, and 840 can be implemented as an apparatus.

During operation, path monitoring module 820 operates to receive a control packet associated with a session within a predetermined time interval via one of communication ports 802. In response to receiving the control packet within the time interval, path monitoring module 820 is adapted to set a receive indicator for the switch to an active state, and in response to not receiving the control packet within the time interval, path monitoring module 820 is adapted to set the receive indicator for the switch to an inactive state. Path monitoring module 820 is also adapted to set a path state associated with the session based on the receive indicators for the switch and the one or more other member switches. Broadcast module 824 is adapted to broadcast at least the receive indicator for the switch to one or more other member switches.

Path monitoring module 820 is further adapted to, in response to receiving a notification message from another member switch that includes the receive indicator of the other member switch: store the receive indicator of the other switch; and set the path state based on the receive indicator for the other switch. Path monitoring module 820 is further adapted to, in response to receiving a notification message from another member switch that includes session parameters and a create command, create a session database based on the session parameters.

In some embodiments, switch 800 is designated as a master switch. Session initiator module 822 is adapted to establish the session that corresponds to a path between the network of interconnected switches and a destination endpoint based on session parameters, wherein the session is based on a bidirectional forwarding detection (BFD) protocol. Session initiator module 822 is also adapted to create the session database based on the session parameters. Broadcast module 824 is further adapted to broadcast the session parameters and a create command to the other member switches. Forwarding module 826 is adapted to construct a control packet that is destined for the destination endpoint. Path monitoring module 820 is further adapted to, in response to determining that the path state is inactive, initiate a tear down of the path. Link tracking module 828 is adapted to determine a status of all interfaces connecting to a next-hop core router. In response to determining that the status is down, link tracking module 828 is adapted to initiate a failover to one of the other member switches and designate a new master. Broadcast module 824 is further adapted to broadcast a message to the other member switches to remove the switch from an active load balancing scheme. Link tracking module 828 is further adapted to determine that the status of at least one of the interfaces is up. Broadcast module 824 is further adapted to broadcast a message to the other member switches to add the switch to an active load balancing scheme.

Storage 850 can store a session database which indicates parameters for the session and includes one or more of: a session identifier; a source address; a destination address; a master switch identifier; receive indicators for the switch and the other member switches; and the path state for the session.

Note that the above-mentioned modules can be implemented in hardware as well as in software. In one embodiment, these modules can be embodied in computer-executable instructions stored in a memory which is coupled to one or more processors in switch 800. When executed, these instructions cause the processor(s) to perform the aforementioned functions.

In summary, embodiments of the present invention provide a switch, method, and computer system for monitoring the health of an extension tunnel. In one embodiment, the switch includes a path monitoring apparatus and a broadcast apparatus. During operation, the path monitoring apparatus, via the switch, in response to a control packet or absence of the control packet within a predetermined time interval, sets a receive indicator for the switch to an active or inactive state, and sets a path state associated with the session based on the receive indicators for the switch and one or more other member switches. The broadcast apparatus broadcasts at least the receive indicator for the switch to one or more other member switches. In another embodiment, the path monitoring apparatus, in response to a notification message from another member switch that includes the receive indicator for the other switch, stores the receive indicator for the other switch and sets the path state based on the receive indicator for the other switch. In another embodiment, the switch is designated as a master and performs the operations described herein. Thus, the switch facilitates monitoring the health of an extension tunnel in a distributed architecture by allowing each member switch to maintain its own synchronized version of a session database, and allowing the designated master switch to determine an appropriate action based on a path state for a particular BFD session.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
one or more ports;
tunnel circuitry configured to jointly operate the switch and a second switch in a network of interconnected switches as a tunnel endpoint for a tunnel session;
monitoring circuitry configured to:
in response to identifying a control packet associated with the tunnel session within a predetermined time interval, determine that the switch is active for the tunnel session;
set a path state associated with the tunnel session indicating at least one active path for the tunnel session; and notification circuitry configured to generate a first notification message, which is destined to the second switch and indicates that the switch is active for the tunnel session.

2. The switch of claim 1, wherein monitoring circuitry is further configured to:
in response to identifying a second notification message from the second switch:
determine that the second switch is active for the tunnel session; and
set the path state indicating at least one active path for the tunnel session based on the second notification message from the second switch.

3. The switch of claim 1, wherein the monitoring circuitry is further configured to:
in response to identifying a second notification message, from the second switch, that includes session parameters and a create command, create a session database comprising the session parameters.

4. The switch of claim 1, further comprising a storage device configured to store a session database, which indicates parameters for the tunnel session and includes one or more of:
a session identifier;
a source address;
a destination address;
a master switch identifier;
receive indicators for the switch and the second switch; and
the path state for the tunnel session.

5. The switch of claim 1, wherein the tunnel session is based on one or more of:
a virtual extensible local area network protocol;
a generic routing encapsulation protocol; and
a tunneling protocol based on encapsulation of a layer-2 compatible frame.

6. The switch of claim 1, wherein the notification circuitry is further configured to generate the first notification message based on an Internet Protocol.

7. The switch of claim 1, wherein the switch and the second switch are each identified by a switch identifier in the network of interconnected switches; and
wherein the first notification message is forwardable in a routed network.

8. The switch of claim 1, wherein the switch is designated as a master switch, and further comprises initiator circuitry configured to:
establish the tunnel session that corresponds to a path between the tunnel endpoint and a destination endpoint based on session parameters, wherein the tunnel session is based on a bidirectional forwarding detection protocol; and
create a session database based on the session parameters; and
wherein the notification circuitry is further configured to generate, for the second switch, a second notification message comprising the session parameters and a create command.

9. The switch of claim 8, further comprising:
forwarding circuitry configured to construct a second control packet destined to the destination endpoint; and
wherein the monitoring circuitry is further configured to, in response to determining that the path state is inactive, initiate a tear down of the path.

10. The switch of claim 8, further comprising:
tracking circuitry configured to:
determine a status of one or more local interfaces corresponding to a next-hop router; and
in response to determining that the status of the one or more local interfaces is down:
initiate a failover to the second switch; and
designate the second switch as a new master switch; and
wherein the notification circuitry is further configured to generate, for the second switch, a third notification message instructing to remove the switch from an active load balancing scheme.

11. The switch of claim 10, wherein the tracking circuitry is further configured to:
determine that the status of at least one of the one or more local interfaces is up; and
wherein the notification circuitry is further configured to generate, for the second switch, a fourth notification instructing to add the switch to the active load balancing scheme.

12. The switch of claim 10, wherein the tracking circuitry is further configured to:
determine that the master switch is unable to determine whether the master switch is active for the tunnel session; and
wherein the monitoring circuitry is further configured to trigger a failover to a third switch associated with the tunnel endpoint.

13. A computer-implemented method, comprising:
jointly operating a first switch and a second switch in a network of interconnected switches as a tunnel endpoint for a tunnel session;
in response to identifying a control packet associated with the tunnel session within a predetermined time interval, determine that the first switch is active for the tunnel session;
setting a path state associated with the tunnel session indicating at least one active path for the tunnel session; and
generate a first notification message, which is destined to the second switch and indicates that the first switch is active for the tunnel session.

14. The method of claim 13, further comprising:
in response to identifying a second notification message from the second switch:
determining that the second switch is active for the tunnel session; and
setting the path state indicating at least one active path for the tunnel session based on the second notification message from the second switch.

15. The method of claim 13, further comprising:
in response to identifying a second notification message, from the second switch, that includes session parameters and a create command, creating a session database comprising the session parameters.

16. The method of claim 13, further comprising storing, in a storage device of the first switch, a session database, which indicates parameters for the tunnel session and includes one or more of:
a session identifier;
a source address;
a destination address;
a master switch identifier;
receive indicators for the first switch and the second switch; and
the path state for the tunnel session.

17. The method of claim 13, wherein the tunnel session is based on one or more of:

a virtual extensible local area network protocol;
a generic routing encapsulation protocol; and
a tunneling protocol based on encapsulation of a layer-2 compatible frame.

18. The method of claim 13, wherein generating the first notification message is based on an Internet Protocol.

19. The method of claim 13, wherein the first switch and the second switch are each identified by a switch identifier in the network of interconnected switches; and
wherein the first notification message is forwardable in a routed network.

20. The method of claim 13, wherein the first switch is designated as a master switch, and wherein the method further comprises:
establishing the tunnel session that corresponds to a path between the tunnel endpoint and a destination endpoint based on session parameters, wherein the tunnel session is based on a bidirectional forwarding detection protocol;
creating a session database based on the session parameters; and
generating, for the second switch, a second notification message comprising the session parameters and a create command.

21. The method of claim 20, further comprising:
constructing a second control packet destined to the destination endpoint; and
in response to determining that the path state is inactive, initiating a tear down of the path.

22. The method of claim 20, further comprising:
determining a status of one or more interfaces of the first switch corresponding to a next-hop router;
in response to determining that the status of the one or more interfaces is down:
initiating a failover to the second switch; and
designating the second switch as a new master switch; and
generate, for the second switch, a third notification instructing to remove the first switch from an active load balancing scheme.

23. The method of claim 22, further comprising:
determining that the status of at least one of the one or more interfaces is up; and
generate, for the second switch, a fourth notification message instructing to add the first switch to an active load balancing scheme.

24. The method of claim 22, further comprising:
determining that the master switch is unable to determine whether the master switch is active for the tunnel session; and
triggering a failover to a third switch associated with the tunnel endpoint.

25. A computer system for monitoring path health, the system comprising:
a processor; and
a storage device coupled to the processor and storing instructions that when executed by a computer cause the computer to perform a method, the method comprising:
jointly operating a first switch and a second switch in a network of interconnected switches as a tunnel endpoint for a tunnel session;
in response to identifying a control packet associated with the tunnel session within a predetermined time interval, determining that the first switch is active for the tunnel session;
setting a path state associated with the tunnel session indicating at least one active path for the tunnel session; and
generating a first notification message, which is destined to the second switch and indicates that the first switch is active for the tunnel session.

* * * * *